(12) United States Patent
Williams et al.

(10) Patent No.: US 10,835,770 B2
(45) Date of Patent: *Nov. 17, 2020

(54) FOCUSED STREAM, AERATED FOAM PROJECTING NOZZLE INCLUDING FIXED WAND SYSTEM AND METHOD AS WELL AS POSSIBLY PORTABLE CENTER POINTING NOZZLE

(71) Applicant: Tyco Fire Products LP, Lansdale, PA (US)

(72) Inventors: Dwight P. Williams, Vidor, TX (US); Casey R. Spears, Nederland, TX (US)

(73) Assignee: Tyco Fire Products LP, Lansdale, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/475,429

(22) Filed: Mar. 31, 2017

(65) Prior Publication Data

US 2017/0239501 A1 Aug. 24, 2017

Related U.S. Application Data

(62) Division of application No. 13/261,639, filed as application No. PCT/US2011/001769 on Oct. 17, 2011, now Pat. No. 10,300,317.

(Continued)

(51) Int. Cl.
*A62C 3/06* (2006.01)
*B05B 1/26* (2006.01)
(Continued)

(52) U.S. Cl.
CPC .............. *A62C 3/065* (2013.01); *A62C 31/05* (2013.01); *A62C 31/12* (2013.01); *B05B 1/26* (2013.01); *B05B 1/265* (2013.01); *B05B 1/14* (2013.01)

(58) Field of Classification Search
CPC ........... A62C 3/06; A62C 31/12; A62C 3/065; B05B 1/14; B05B 1/26
(Continued)

(56) References Cited

U.S. PATENT DOCUMENTS 1,011,315 A 12/1911 Canner
1,455,789 A 5/1923 Holmes
(Continued)

FOREIGN PATENT DOCUMENTS

CN 101115532 1/2008
DE 838249 5/1952
(Continued)

OTHER PUBLICATIONS

Akron Brass, "Single Shutoff Saberjet Nozzles", web page printouts from website www.akronbrass.com, 16 pages; printed on May 30, 2007.
(Continued)

*Primary Examiner* — Chee-Chong Lee
(74) *Attorney, Agent, or Firm* — Foley & Lardner LLP

(57) ABSTRACT

The invention includes components and methodology for fixed and semi-fixed systems for extinguishing fire in large industrial flammable liquid storage tanks, including aerated foam projecting nozzles discharging substantially focused streams together with aeration chambers and risers and the formation of wand heads and wands.

19 Claims, 17 Drawing Sheets

Related U.S. Application Data

(60) Provisional application No. 61/519,071, filed on May 16, 2011, provisional application No. 61/463,296, filed on Feb. 14, 2011, provisional application No. 61/461,413, filed on Jan. 18, 2011, provisional application No. 61/455,367, filed on Oct. 19, 2010.

(51) Int. Cl.
  *A62C 31/12* (2006.01)
  *A62C 31/05* (2006.01)
  *B05B 1/14* (2006.01)

(58) Field of Classification Search
  USPC .............................................. 169/44, 46, 68
  See application file for complete search history.

(56) References Cited

U.S. PATENT DOCUMENTS

| | | | |
|---|---|---|---|
| 1,679,243 A | 7/1928 | Fasul | |
| 1,770,623 A | 7/1930 | Neumann | |
| 2,376,881 A | 5/1945 | Adolph | |
| 2,389,642 A | 11/1945 | Schellin et al. | |
| 2,478,998 A * | 8/1949 | Boyd | B01F 5/0408 138/37 |
| 2,512,456 A * | 6/1950 | Boyd | B01F 5/0408 239/428 |
| 2,597,913 A | 5/1952 | Webster | |
| 2,618,346 A | 11/1952 | Bedford et al. | |
| 2,695,069 A * | 11/1954 | Boerner | A62C 5/002 169/70 |
| 2,772,743 A | 12/1956 | Eggleston | |
| 3,094,171 A | 6/1963 | Gagliardo | |
| 3,363,842 A | 1/1968 | Burns | |
| 3,741,309 A | 6/1973 | McCulloch | |
| 3,876,010 A | 4/1975 | Blomquist et al. | |
| 3,896,881 A | 7/1975 | De Boer | |
| 4,064,944 A | 12/1977 | McClure | |
| 4,069,873 A | 1/1978 | McClure | |
| 4,106,566 A | 8/1978 | Dion-Biro | |
| 4,197,914 A * | 4/1980 | Grey | A62C 3/10 114/201 R |
| 4,314,671 A | 2/1982 | Briar | |
| 4,640,461 A | 2/1987 | Williams | |
| 4,674,686 A | 6/1987 | Trapp | |
| 4,781,252 A | 11/1988 | Wilburn et al. | |
| 4,893,681 A * | 1/1990 | Flandre | A62C 3/06 169/14 |
| 4,944,460 A | 7/1990 | Steingass | |
| 5,012,979 A | 5/1991 | Williams | |
| 5,054,688 A | 10/1991 | Grindley | |
| 5,055,008 A | 10/1991 | Daniels et al. | |
| 5,167,285 A | 12/1992 | Williams et al. | |
| 5,312,041 A | 5/1994 | Williams | |
| 5,566,766 A | 10/1996 | Williams | |
| 5,590,719 A | 1/1997 | McLouglin | |
| 5,779,159 A | 7/1998 | Williams et al. | |
| 5,848,752 A | 12/1998 | Kolacz | |
| 5,887,789 A * | 3/1999 | Szabo | B65B 3/22 239/1 |
| 5,893,519 A | 4/1999 | Cavaretta et al. | |
| 5,913,366 A | 6/1999 | Williams et al. | |
| 5,992,529 A | 11/1999 | Williams | |
| 6,089,474 A | 7/2000 | Marino | |
| 6,102,308 A | 8/2000 | Steingass et al. | |
| 6,293,294 B1 | 9/2001 | Loeb et al. | |
| 6,321,771 B1 | 11/2001 | Brazier et al. | |
| 6,877,676 B2 | 4/2005 | Saner | |
| 7,097,120 B2 | 8/2006 | Marino | |
| 7,114,575 B2 | 10/2006 | De Anda-Uribe et al. | |
| 7,207,501 B2 | 4/2007 | Hanratty | |
| 8,215,412 B2 | 7/2012 | Williams et al. | |
| 8,261,843 B2 | 9/2012 | Daspit et al. | |
| 2002/0125015 A1 | 9/2002 | Crabtree et al. | |
| 2003/0213602 A1 | 11/2003 | Williams | |
| 2004/0084192 A1 | 5/2004 | Crabtree | |
| 2004/0123991 A1 | 7/2004 | Hanratty | |
| 2004/0140106 A1 * | 7/2004 | De Anda-Uribe | A62C 31/24 169/66 |
| 2007/0119605 A1 | 5/2007 | Williams | |
| 2009/0020629 A1 | 1/2009 | Marino | |
| 2009/0114405 A1 | 5/2009 | Schmitz et al. | |
| 2009/0242216 A1 | 10/2009 | Daspit et al. | |
| 2010/0163256 A1 | 7/2010 | Williams | |
| 2012/0085840 A1 | 4/2012 | Marino | |

FOREIGN PATENT DOCUMENTS

| | | |
|---|---|---|
| DE | 26 12 822 | 9/1977 |
| FR | 2552336 | 3/1985 |
| FR | 2856603 A1 | 12/2004 |
| GB | 2 438 587 | 12/2007 |
| JP | S08-7580 | 6/1933 |
| JP | 55-114657 | 2/1979 |
| JP | S55-114657 | 2/1979 |
| JP | 61-16160 | 1/1986 |
| JP | S61-016160 | 1/1986 |
| JP | H05-184694 A | 7/1993 |
| JP | H05-231587 | 9/1993 |
| JP | H08-74777 | 3/1996 |
| JP | 2610398 B2 | 5/1997 |
| JP | H09-299499 | 11/1997 |
| JP | 2977921 B2 | 11/1999 |
| JP | 2000-325490 A | 11/2000 |
| JP | 2001-500397 | 1/2001 |
| JP | 3213057 B2 | 9/2001 |
| JP | 2002-172183 | 6/2002 |
| JP | 3448303 B2 | 9/2003 |
| JP | 2008-517635 | 5/2008 |
| JP | 4233681 B2 | 3/2009 |
| JP | 2009-514574 | 4/2009 |
| JP | 5229939 B2 | 7/2013 |
| WO | WO 98/03226 | 1/1998 |
| WO | WO 2000/21614 | 4/2000 |
| WO | WO 01/77551 A2 | 10/2001 |
| WO | WO 2006/023434 A1 | 3/2006 |
| WO | WO 2008/153795 A1 | 12/2008 |
| WO | WO 2008/156522 A2 | 12/2008 |

OTHER PUBLICATIONS

Task Force Tips, "A Guide to Nozzles", 2001, 34 pages.
Williams Fire & Hazard Control, "Williams Product Catalogue", 29 pages, printed at least as early as May 10, 2010.
Rosenbauer, "RM 60E, The High-Performance Turret", web page printout from website www.rosenbauer.com, 1 page, printed at least as early as May 10, 2010.
National Foam, Inc., "Data Sheet #NDD180", product information brochure, 2 pages, printed at least as early as May 10, 2010.
Elkhart Brass, "Master Stream, R.A.N.™—Raid Attack Nozzle", web page printout from website www.elkhartbrass.com, 1 page, printed at least as early as May 10, 2010.
Non-Final Office Action for U.S. Appl. No. 12/451,687 dated Mar. 19, 2012; 7 pages.
Non-Final Office Action for U.S. Appl. No. 12/451,687 dated Jul. 2, 2012; 9 pages.
Final Office Action for U.S. Appl. No. 12/451,687 dated Nov. 28, 2012; 12 pages.
Non-Final Office Action for U.S. Appl. No. 12/451,687 dated Aug. 6, 2013; 9 page.
Non-Final Office Action for U.S. Appl. No. 12/451,687 dated Nov. 26, 2013; 8 pages.
Final Office Action for U.S. Appl. No. 12/451,687 dated Apr. 22, 2014; 11 pages.
Non-Final Office Action for U.S. Appl. No. 12/451,687 dated Aug. 7, 2014; 8 pages.
Final Office Action for U.S. Appl. No. 12/451,687 dated Nov. 28, 2014; 11 pages.
Non-Final Office Action for U.S. Appl. No. 12/451,687 dated Mar. 4, 2015; 9 pages.

(56) References Cited

OTHER PUBLICATIONS

Non-Final Office Action for U.S. Appl. No. 12/451,687 dated Jun. 24, 2015; 11 pages.
Final Office Action for U.S. Appl. No. 12/451,687 dated Oct. 26, 2015; 10 pages.
Non-Final Office Action for U.S. Appl. No. 15/351,656 dated Jul. 27, 2017; 12 pages.
Election/Restriction Requirement for U.S. Appl. No. 15/351,656 dated Apr. 4, 2017; 9 pages.
International Search Report for International Patent Appln. No. PCT/US2011/001768 dated Feb. 29, 2012, 3 pages.
International Preliminary Report on Patentability for International Patent Appln. No. PCT/US2011/001768 dated Oct. 2, 2012, 19 pages.
Written Opinion of the International Searching Authority for International Patent Appln. No. PCT/US2011/001768 dated Feb. 29, 2012, 7 pages.
NFPA 11 Standard for Low-, Medium-, and High-Expansion Foam; 2002 Edition; National Fire Protection Association (NFPA); Quincy, MA; pp. 148-150.
Wang Chunhua; "Fire-Fighting Design and Computing of Fixed Top Tank Foam Extinguishing System;" Safety, No. 2; Feb. 28, 2006; pp. 20-22. Reference discussed in English translation of the search report of Chinese Application No. 01180661170.5 dated Dec. 17, 2014.
Chen Guifeng; "Discussion of Design of Foam Extinguishing System with Low Multiplication Factor;" Light Metals, No. 9; Sep. 20, 2009; pp. 61-64. Reference discussed in English translation of the search report of Chinese Application No. 01180661170.5 dated Dec. 17, 2014.
Lang Xuqing et al., "Research on the Fire-fighting System of the Large Floating Roof Tanks;" Fire-Fighting System Design, vol. 28, No. 5; May 15, 2009; p. 342-345. Reference discussed in English translation of the search report of Chinese Application No. 01180661170.5 dated Dec. 17, 2014.
Mi Yixing et al., "Design of Foam Extinguishing System with Low Multiplication Factor;" Fire Technique and Products Information, Dec. 30, 1998; pp. 190-226. Reference discussed in English translation of the search report of Chinese Application No. 01180661170.5 dated Dec. 17, 2014.
First Office Action for Chinese Patent Application No. 01180661170.5 dated Dec. 17, 2014 with English Translation, 42 pages.
Henry Persson and Anders Lonnermark, SP Fire Technology 2004.
Examination Report for Indian Application No. 3003/CHENP/2013, dated Jan. 29, 2019, 6 pages.
Examination Report for Indian Application No. 3004/CHENP/2013, dated Jan. 22, 2019, 5 pages.
Search Report for Chinese Patent Application No. 01180661170.5 dated Dec. 9, 2014 with English Translation, 5 pages.

\* cited by examiner

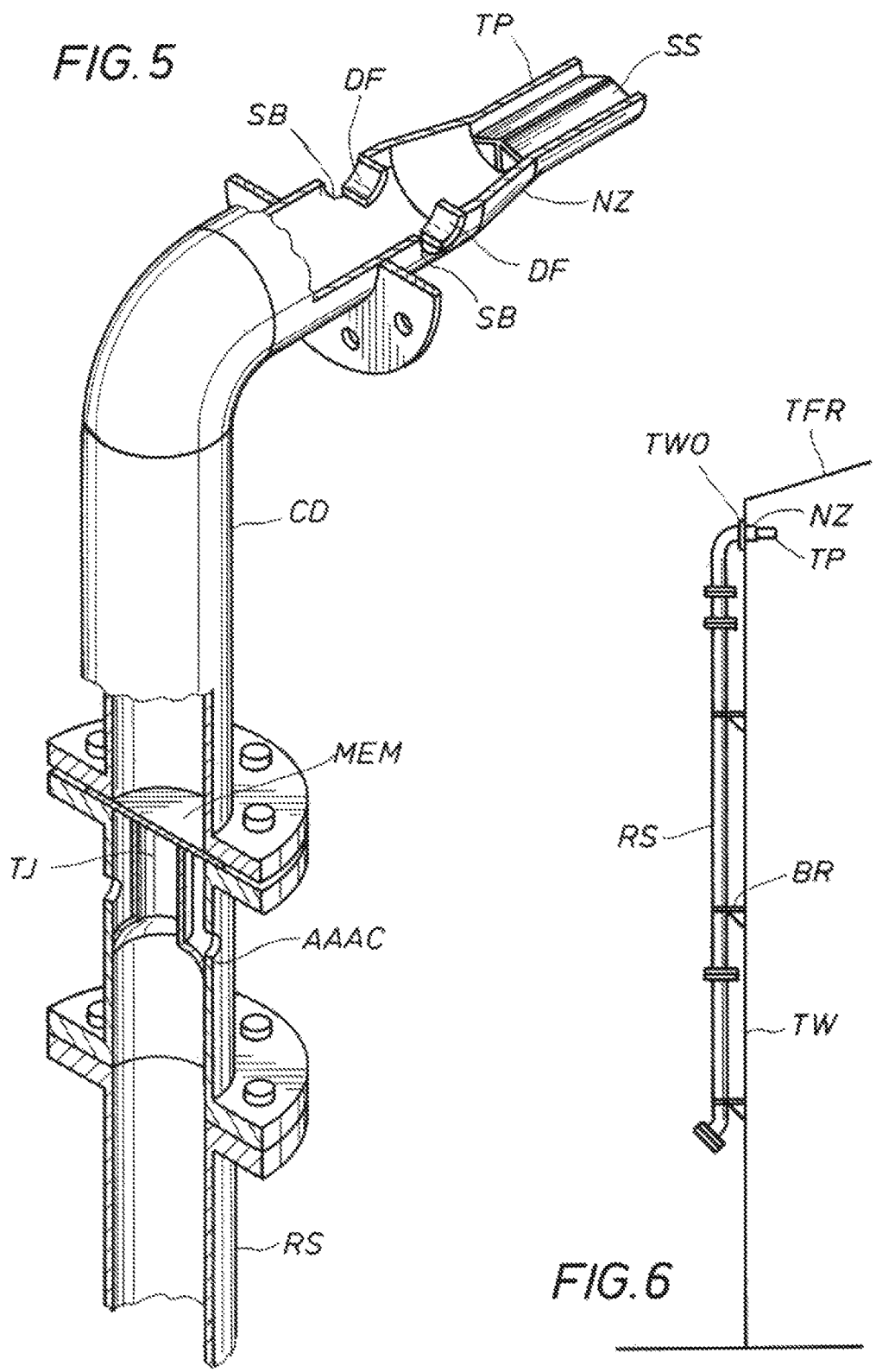

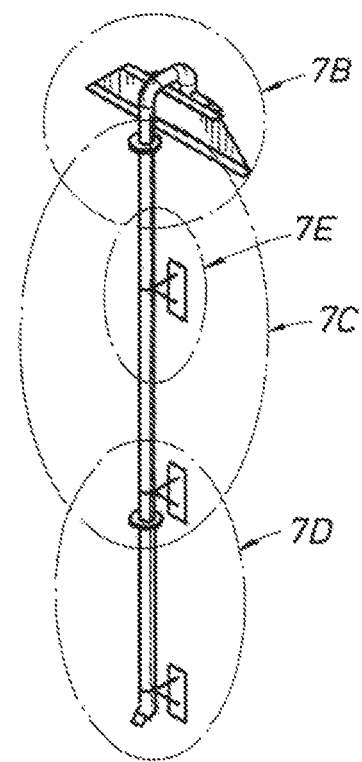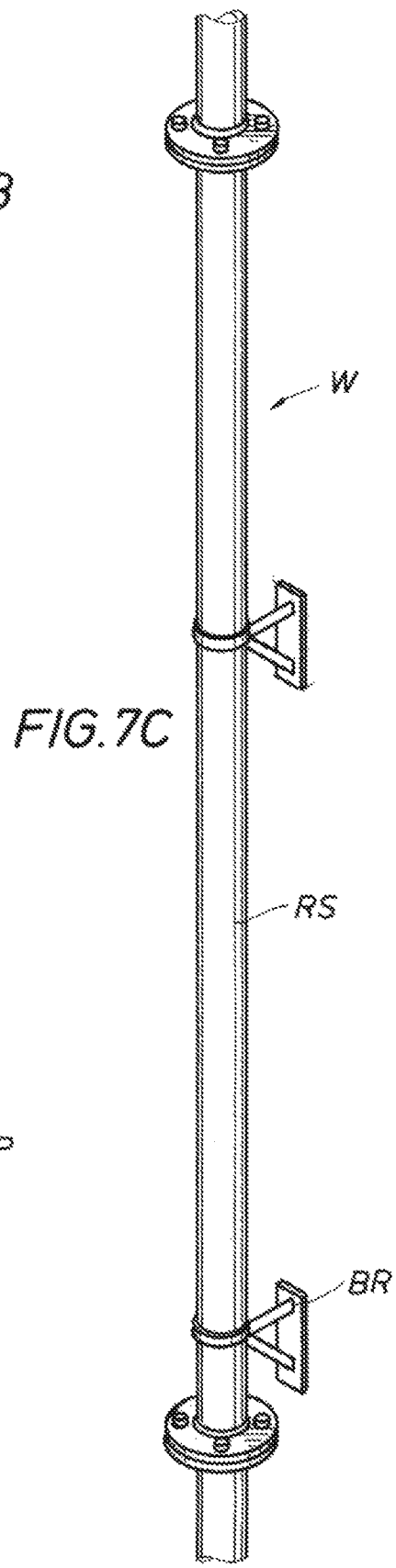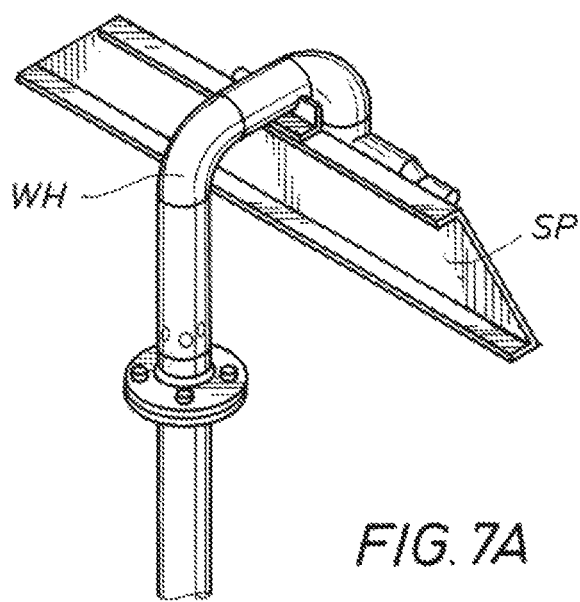

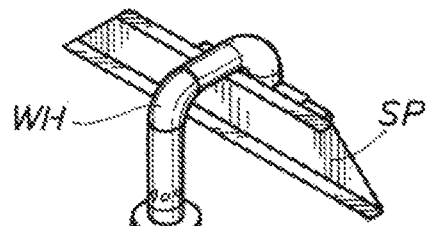
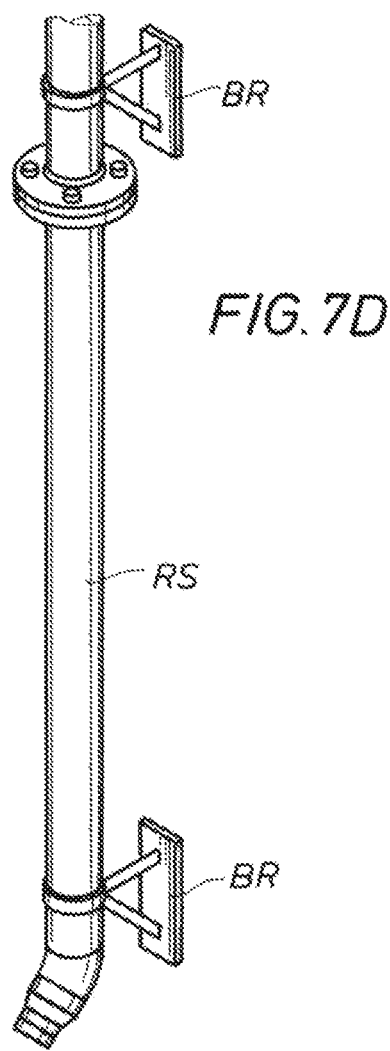
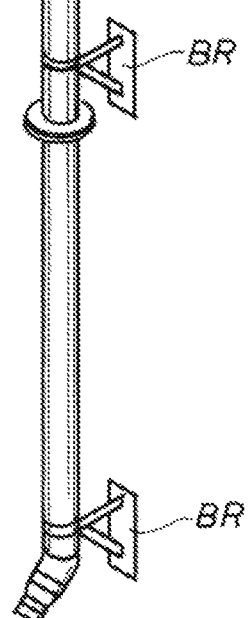
FIG. 7D
FIG. 7F
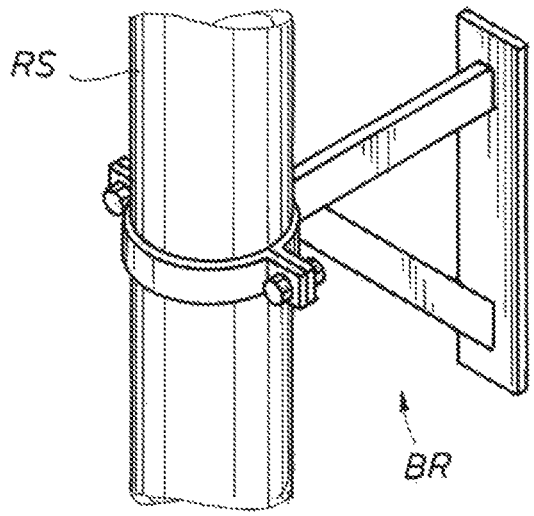
FIG. 7E

FIG. 8G
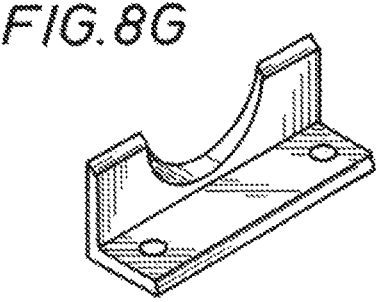
FIG. 8L
FIG. 8E
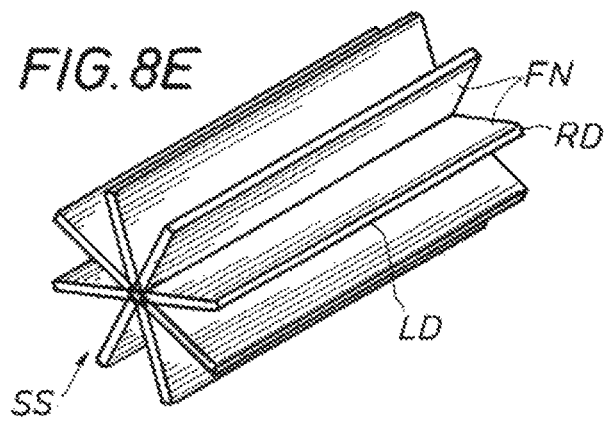
FIG. 8M
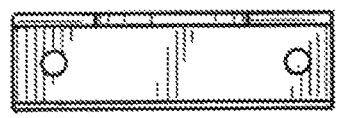
FIG. 8H
FIG. 8I
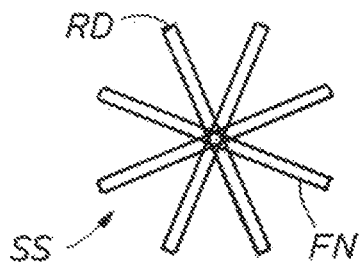
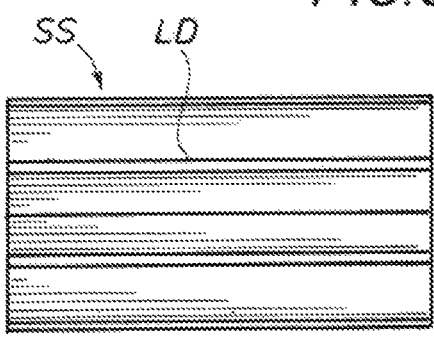
FIG. 8J
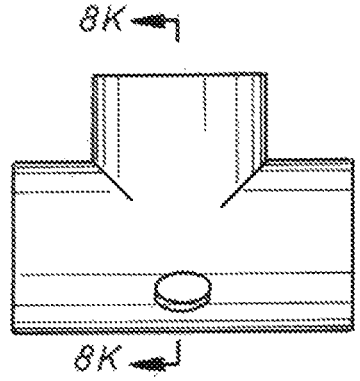
FIG. 8K
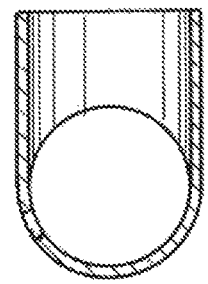

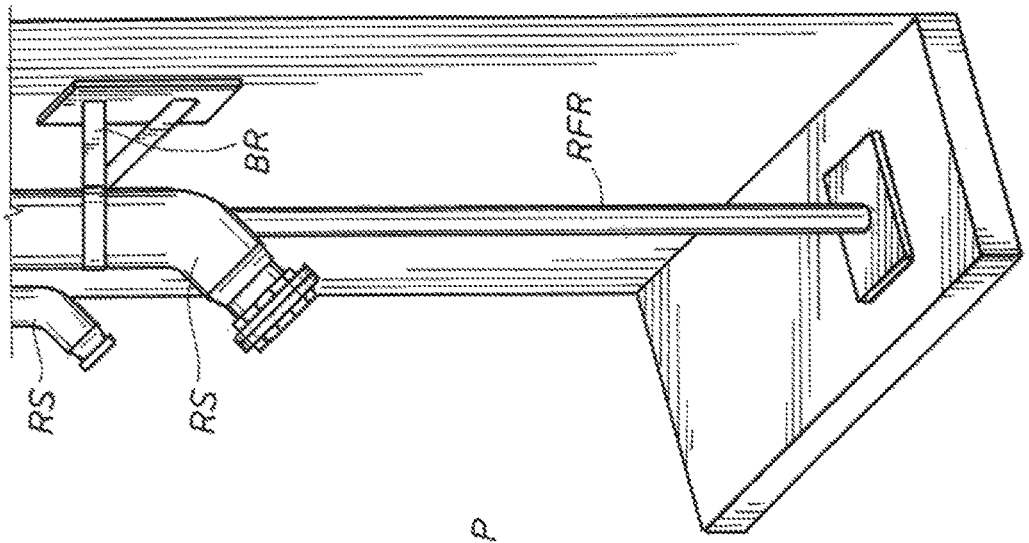
FIG. 10
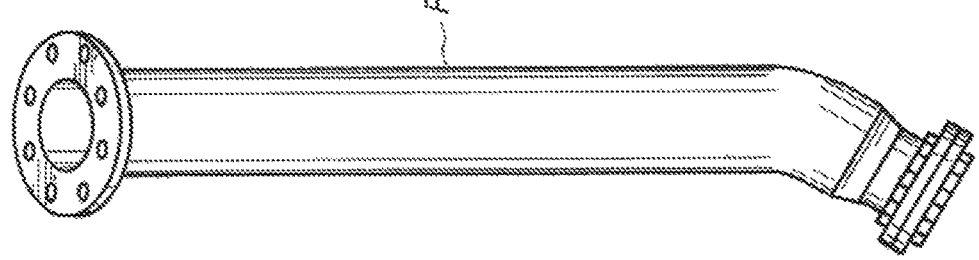
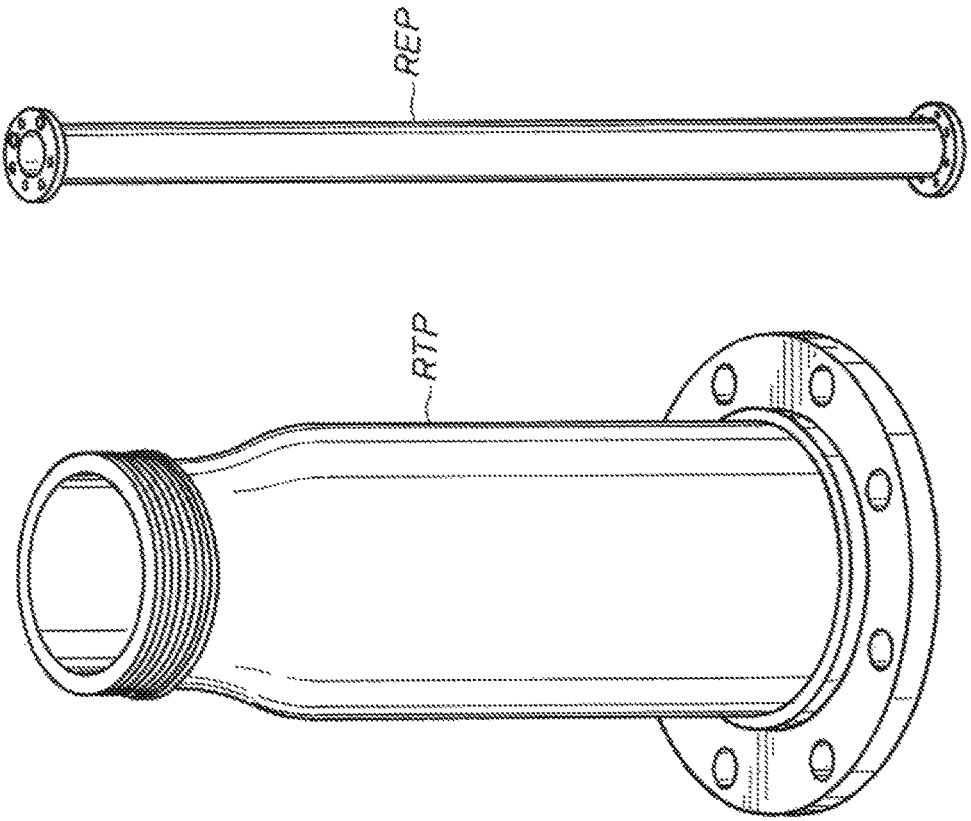
FIG. 9

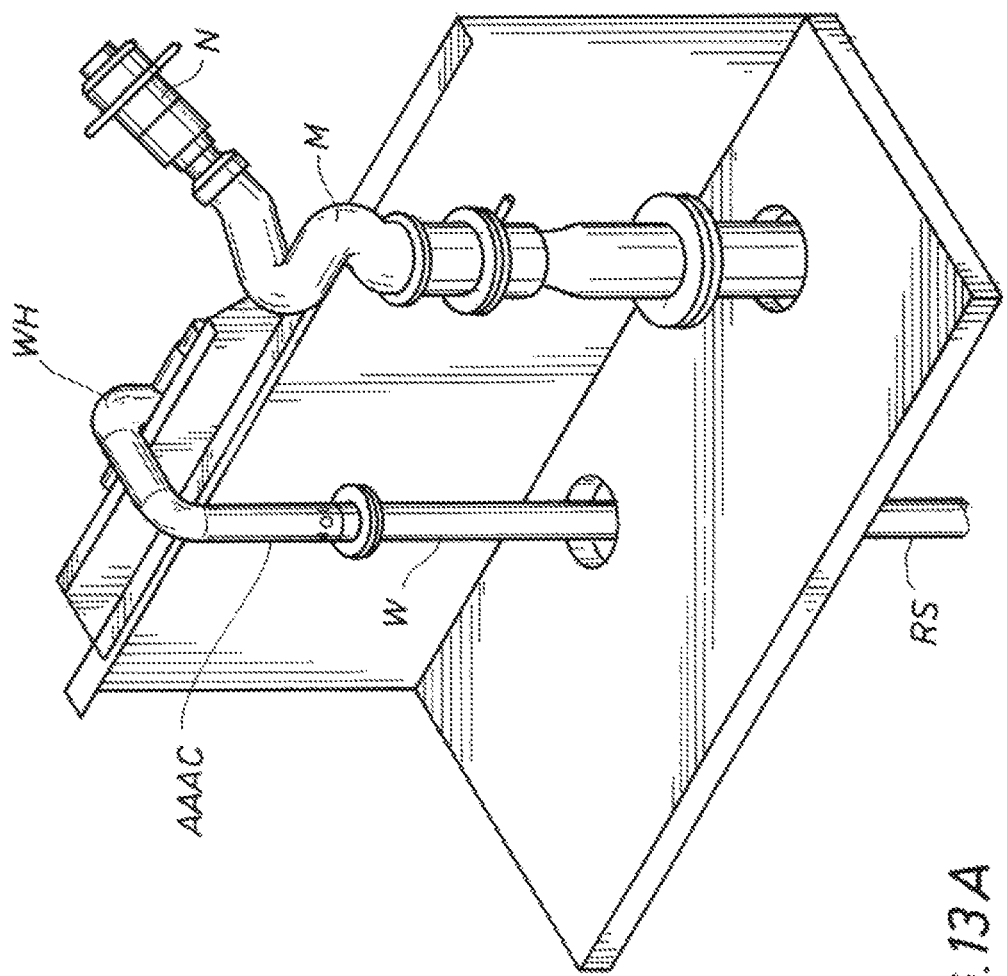
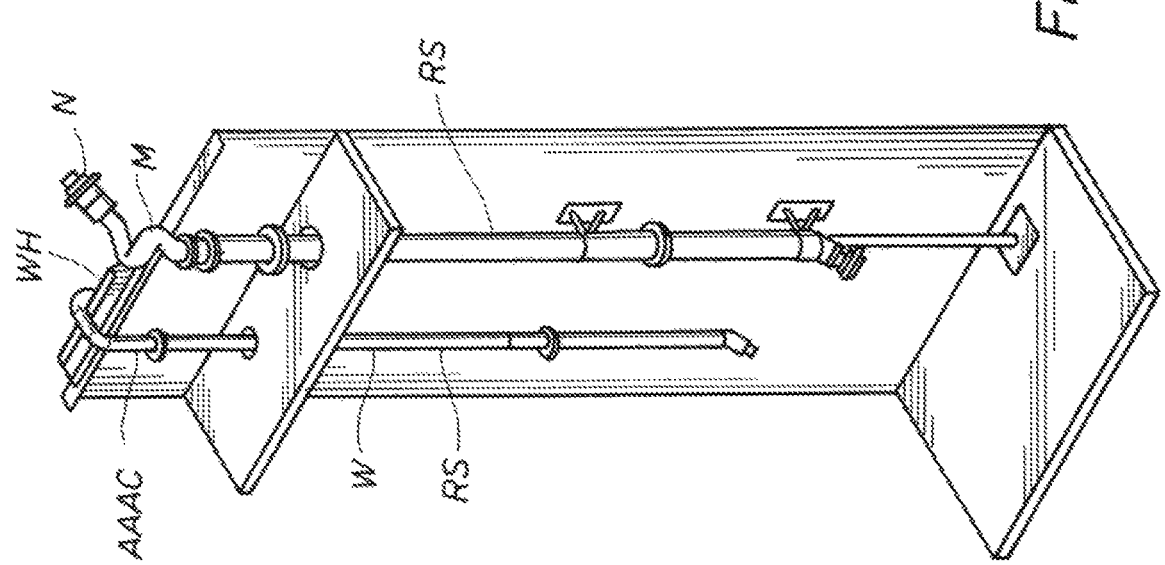

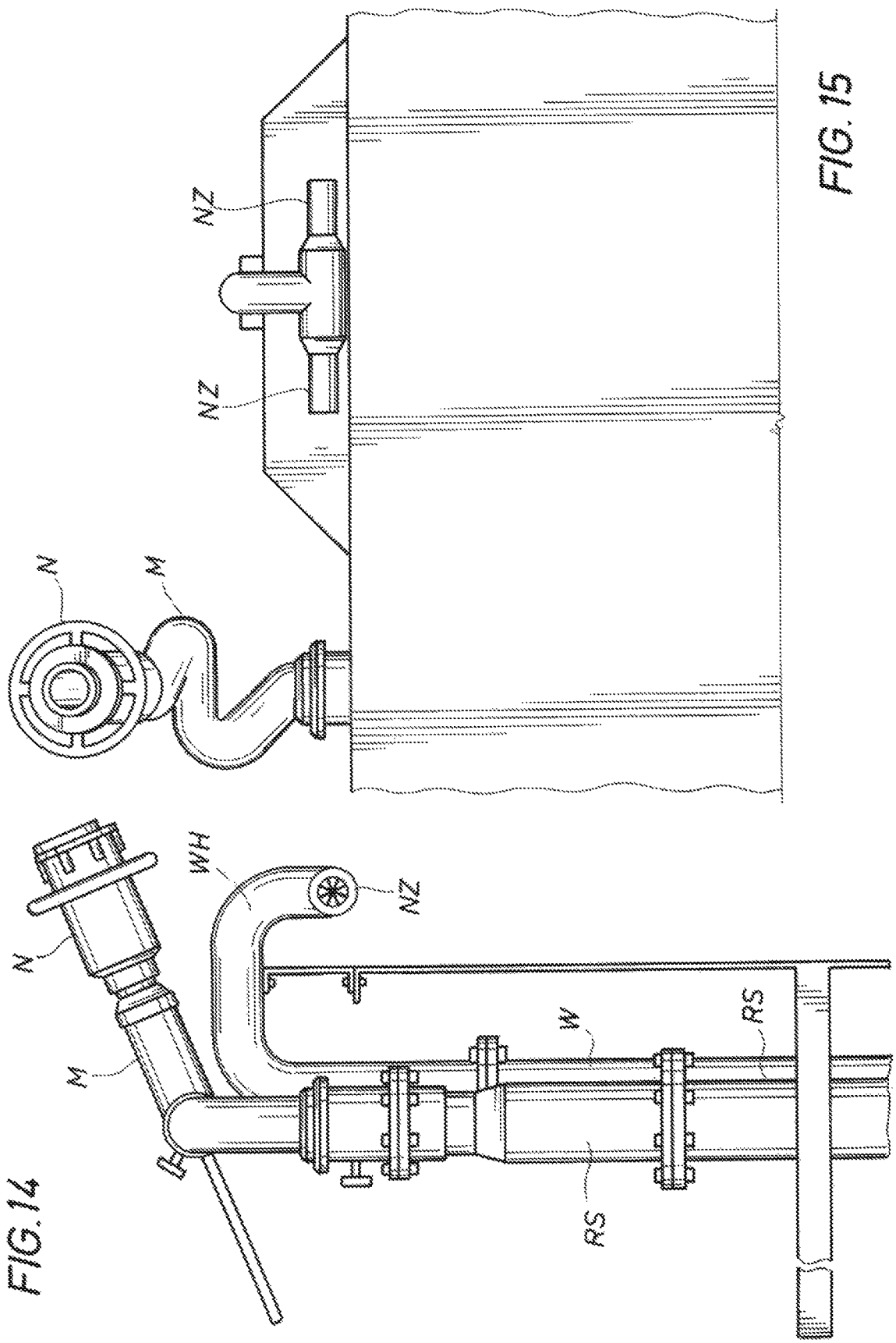

| NUMBER OF FOAM WANDS FOR FULL ENCIRCLEMENT SEAL PROTECTION ||
|---|---|
| 240' COVERAGE FROM EACH - 24" TALL FOAM DAM REQUIRED ||
| TANK DIAMETER | NO. OF FOAM WANDS REQUIRED |
| 0' - 76' | 1 |
| 77' - 153' | 2 |
| 154' - 229' | 3 |
| 230' - 306' | 4 |
| 307' - 382' | 5 |
| 383' - 458' | 6 |

FIG. 18

| NUMBER OF FOAM WANDS FOR FULL ENCIRCLEMENT SEAL PROTECTION ||
|---|---|
| 120' COVERAGE FROM EACH - FOAM DAMS LESS THAN 24" TALL ||
| TANK DIAMETER | ...FOR FOAM DAMS LESS THAN 24" TALL |
| 0' - 38' | 1 |
| 39' - 76' | 2 |
| 77' - 115' | 3 |
| 116' - 153' | 4 |
| 154' - 191' | 5 |
| 192' - 229' | 6 |
| 230' - 267' | 7 |
| 268' - 306' | 8 |
| 307' - 344' | 9 |
| 345' - 382' | 10 |
| 383' - 420' | 11 |
| 421' - 458' | 12 |

FIG. 19

FOCUSED STREAM, AERATED FOAM PROJECTING NOZZLE INCLUDING FIXED WAND SYSTEM AND METHOD AS WELL AS POSSIBLY PORTABLE CENTER POINTING NOZZLE

CROSS REFERENCE TO RELATED APPLICATIONS

This application is a divisional of, is related to and claims priority to, co-pending U.S. Ser. No. 13/261,639, of same name and same inventors, filed Apr. 16, 2013 as a national stage application of PCT/US11/01769, filed Oct. 17, 2011 and which claims priority to four provisional applications by the same inventors: U.S. Ser. Nos. 61/455,367, 61/461,413, 61/463,296 and 61/519,071 filed Oct. 19, 2010, Jan. 18, 2011, Feb. 14, 2011 and May 16, 2011 and entitled "Rapid Tank Response, Equipment and Methodology;" "A Point and Shoot System (including as previously filed,) An Ambush System and Method and a Hollow Point System and Method, all for Fighting Industrial Tank Hazards;" "Further Developments—Fixed System (Point and Shoot, Ambush and Hollow Point)," and "Fixed/Semi-Fixed Aerated Foam Systems for Industrial Tank Hazards," respectively. The four applications are all herein and hereby incorporated by reference in their entirety to the extent permitted by law and regulation.

FIELD OF THE INVENTION

The field of this invention lies in fixed and semi-fixed systems for the assistance of fire extinguishment and/or for addressing hazards and/or vapor suppression in industrial storage tanks, being particularly suited for large (at least greater than 60 foot diameter) industrial tanks storing flammable liquids and hydrocarbon products and the like. Such tanks may be more particularly differentiated by whether or not they have a fixed roof. The field of the invention lies in fire fighting nozzles for large industrial tanks, and more particularly in focused stream aerated foam projecting nozzles capable of projecting fire fighting foam in a substantially focused stream. The field of the invention lies in fixed and semi-fixed nozzle systems and methods for extinguishing fire in large industrial tanks, and more particularly, in fixed wand systems plus fixed center pointing nozzle(s) or a portable point and shoot monitor and nozzle system and method.

BACKGROUND OF THE INVENTION

Industry Background

Williams Fire and Hazard Control, Inc. (Williams) has been a leader in the design, development, and production of specialty firefighting equipment and methodology for use on large industrial tank fires. A study published in a report by SP Fire Technology in 2004, written by Henry Persson and Anders Lonnermark, stated:

Despite the lack of large-scale tank fire tests in the last 15 to 20 years, significant improvements have been made regarding tank fire fighting using mobile equipment. The pioneers in this development have been Williams Fire & Hazard Control Inc. (WFHC) drawing attention to the need for solving the logistics during a fire and to use relevant tactics. By using large capacity monitors, large diameter hose and foam concentrate stored in bulk containers, the logistics become manageable. The use of large-scale monitors has also made it possible to achieve sufficiently high application rates in order to compensate for foam losses due to wind and thermal updraft. Williams have also introduced the "Footprint" technology where all the foam streams are aimed towards one single landing zone on the fuel surface, resulting in a very high local application rate making the foam spread more rapidly and efficiently. One of the main factors in achieving an efficient extinguishment, according to Williams, is the use of a high quality foam, suited for tank fire protection and until recently, they were primarily using 3M AFFF/ATC. Due to 3M's withdrawal from the foam business a similar foam type is now used, manufactured by Ansul. "Thunderstorm ATC." In 1983, Williams extinguished a 45.7 m (150 ft) diameter gasoline tank in Chalmette, La. ("Tenneco fire"), which at that time was the largest tank ever extinguished using mobile equipment. A new record was set in 2001 when an 82.4 m diameter (270 ft) gasoline tank was extinguished in Norco, La. ("Orion fire"). The concept for tank fire fighting used by Williams has been shown to be successful in many other fires [35] and the concept has also been successfully used by other companies, e.g. during the Sunoco fire in Canada 1996."

(Note: Thunderstorm™ foam concentrates are now developed and produced by Chemguard Inc.)

Historical Development

Historically, Williams has specialized in mobile equipment and methodology. "Fixed system" approaches to large tank fires, historically, have demonstrated limited success in the industry as well as high cost.

On the one hand, for "rim seal fires" (fire around the rim of a tank floating roof, around the roof seal,) traditional fixed system approaches place a large number of "foam chambers" or "foam pourers" around the perimeter of the storage tank, every 40 feet or every 80 feet depending upon whether the "foam dam" on the floating roof is 12" or 24" high. These devices drop or "pour" highly aerated fire fighting foam down the tank wall into the tank "periphery," or area between the tank wall and the "foam dam" on the floating roof, by force of gravity. The cost for such system is high.

On the other hand, for "full surface liquid tank fires" in 100 foot plus diameter tanks, proven fixed systems have not existed. That is, to the inventor's best knowledge, no fixed system has put out a fully engaged full surface liquid tank fire in a 100 foot plus diameter tank.

Williams Fully Portable Systems

"Rim Seal Fire"

Before the "Daspit Tool," Williams successfully used fully portable devices and methods to extinguish "rim seal fires," using a two part attack. In the first phase of the Williams attack a fire fighter approached the tank and hung a portable device (foam wand with a non-reactive nozzle design) over the top edge of the tank proximate a platform or landing. The wand largely dispensed foam directly under the device, suppressing the fire in the immediate vicinity, over a 30 to 40 foot length. After a "beachhead" was established, a "beachhead" of 30 to 40 feet of tank rim with no flames under a landing, fire fighters mounted the tank wall using the ladder leading to the landing, and carried up handheld nozzles and hoses. (The gpm's of handheld nozzles are roughly limited to 60 gpm for a one person nozzle and a 125 gpm for a two person nozzle.) These nozzles were the primary fire extinguishing tools for the seal fire. Having gained access to the top of the tank wall through use of a foam wand, the fire fighters extinguished the "seal fire" by walking the "wind girder" around the tank wall, using the portable nozzles in a known manner.

Daspit Tool System

Subsequently, Williams developed a Daspit tool, a portable base for affixing a portable nozzle and monitor to the top of a tank rim or wall. With the Daspit tool, nozzles up to 2000 gpm could be attached to the top of a tank wall. Specifically again, on "a rim seal fire," with this improved technique, a portable foam wand device was again used to dispense foam downward to establish a "beachhead" area. A fire fighter then carried a Daspit Tool™, (being a clamping device used to secure a temporary fire fighting monitor and nozzle to the top edge of a storage tank, or any other approved mounting location) and hose while climbing the ladder and attached the Tool to the tank rim above the beachhead. The monitor and nozzle were then pressurized with water/foam solution and directed by the fire fighter stationed at the landing to dispense foam inside the tank and shoot out fire located around the tank's perimeter. The entire attack could be set up and executed in a matter of minutes, after, of course, the responding fire fighters had arrived at the scene.

Full Surface Fire

In September of 2004 Williams was called to Cushing, Okla. to assist in the extinguishment of a "full surface" 117 foot diameter crude tank fire. The Williams team arrived with portable foam wands and with "Daspit Tools," monitors and nozzles. (Again, "Daspit Tools" permit staging a monitor and nozzle on a tank wall rim. The "Daspit Tool" provides a base for a monitor and nozzle.) Williams first used portable foam wands to extinguish the fire around an area under a platform and ladder along the wall of the tank. Having gained "control" of that limited area, Williams personnel mounted the ladder of the burning tank to the platform, secured a Daspit Tool there and directed its monitor and nozzle to extinguish the full surface crude tank fire. Thus, Williams provided evidence that a portable foam wand and sufficiently large portable monitor and nozzle (rendered useable by virtue of the Daspit Tool base) could be effectively used to extinguish a "full surface tank fire", at least of crude in at least a 117 foot diameter tank.

Williams Fixed Systems Development

Williams had long appreciated that a "fixed" system, performing appropriate tasks, would be faster and offer much lower risk of harm and danger to personnel. (Danger to personnel includes the clutter on a ladder provided by the hoses necessary to supply a portable monitor and a wand. Furthermore, if such hose were to break while it runs up the ladder, the personnel involved with the ladder and platform would be put in significant danger.)

A problem to solve, and a goal for Williams in industrial tank fire fighting, became to develop a cost-effective, reliable, fixed system for quickly and efficiently blanketing appropriate areas of a tank fire with foam, including not only the "periphery," (which is the location of the "rim seal fire,") but also a tank "full surface fire." Such system, moreover, should perform satisfactorily for tanks of 200 and 300 and 400 feet diameter, and even greater, and include tanks with and/or without a fixed roof, and should not be prohibitively expensive.

The resulting Williams commercial embodiments, discussed below, were developed, tested and designed to solve these problems and meet these goals. The commercial embodiments were designed to protect: (1) floating roof only tanks against "rim seal fire" and vapor hazard; (2) floating roof only tanks against "rim seal fire" and full surface fire; and (3) fixed roof tanks against any surface hazard. The inventive systems are cost-effective and practical, for tank diameters from 100 feet to above 400 feet.

The instant inventors have demonstrated, in the development process, that the industry erred in certain prior assumptions regarding the proper expansion of foam needed for fixed systems, and regarding the capacity to throw or project and run an adequately expanded foam.

The instant inventors have demonstrated, with side by side testing, that "projecting" and "directionally discharging" an "aerated foam" (an expansion of between 2-to-1 and 8-to-1) from an aerated foam nozzle can produce a focused stream of at least 1100 gpm of aerated foam, with a significantly enhanced tight landing footprint, and with a surprising foam run, and including a surprising foam run speed and fire fighting effectiveness. The inventors have shown, with testing, that their aerated foam nozzles can reach a more extensive tank fire surface in a shorter period of time than can prior art "foam chambers." The novel system can extinguish larger tanks with fewer units and is applicable not only to rim seal fires but also to full surface liquid tank fires, including of those of large tanks. The instant inventions, supported by test results, promise cost effective fixed systems to extinguish fires in tanks of diameters greater than 200 feet, greater than 300 feet, and greater than 400 feet. The instant fixed systems are designed to be attached along the tank outer wall, and to discharge into the tank from a point near a top tank wall portion, thereby enhancing the reliability as well as the cost effectiveness of the fixed system, in the event of a hazard.

Invention Development Stages

The instant invention proceeded in several stages. A first determination was made, based on experience and testing, to actively pursue outer tank wall mounted units discharging proximate the tank wall upper rim. (The inventors have experimented with "bubble-up" or so-called Type I systems but have not yet been able to successfully test a satisfactory, practical and cost effective bubble-up system. Pipe-inside-the-tank systems, based on extensive experience, were deemed impractical given the prevalence of floating roofs and the complications inherent therein. In regard to roof mounted systems, either fixed roof or floating roof or systems that "extend-over" the top of the liquid, experience again indicated far too high a likelihood that such a fixed system would be placed out of service by the very incident that causes the fire or hazard.)

A second determination, based on testing, was to preferably discharge aerated foam from an aeration chamber proximate to and upstream of the nozzle, the aerated foam preferably having at least a 2-to-1 to 8-to-1 expansion ratio. A 3-to-1 to 5-to-1 ratio was preferred. A tubular jet ambient air aeration chamber provided a reliable structure for the aeration, able to perform while enduring heat and stress. It was determined by testing that this aerated foam could be significantly projected, could produce a significant foam run, and could run quickly without losing fire fighting effectiveness.

Thirdly, the inventors created a nozzle that could significantly, directionally, "project" and/or "forcefully project" a proper aerated foam in a "substantially focused stream," to land in a focused pattern, with an enhanced tight landing footprint, and again with significant foam run and effective fire extinguishment characteristics. A key to this stage was a stream shaper.

One general belief in the industry had been that "forcefully projecting" aerated foam destroyed the bubbles and resulted in poor foam quality and poor foam run. Prior art fixed systems with aerated foam chambers did not "forcefully project" aerated foam. Rather, for rim seal fires and/or small tanks, they poured or dropped by gravity highly aspirated foam down the inside walls of the tank. This resulted in a low gpm of discharge and a poor foam run.

The instant inventors demonstrated that, with the instant nozzles, the expectation of poor bubble quality and poor foam run for "projected" or "forcefully projected" aerated foam was misplaced. Use of a stream shaper may be instrumental in helping to secure the good results and enhanced landing footprint.

Testing has shown that a stream shaper can significantly enhance the integrity and focus of thrown footprints of aerated foam. Aerated foam discharged through a proper stream shaper has non-destructively landed at least dozens of feet away, in tightly focused footprints, and run surprisingly further and quicker than industry predictions, while maintaining the fire fighting effectiveness of the bubbles. A 2-to-1 to 8-to-1 expanded foam, preferably a 3-to-1 to 5-to-1 expanded foam, can be non-destructively landed in tight target areas to a greater extent and further away than industry expectations. The stream shaper is one key why the instant system can land foam at least 20 feet away in a tank "periphery" and run the foam greater than 100 feet further in the periphery. In preferred embodiments a footprint-enhancing stream shaper for an aerated foam nozzle has four or greater fins, each fin having a longitudinal dimension greater than a radial dimension. Preferably each fin has a longitudinal dimension greater than twice its radial dimension. Preferably also the stream shaper fins are installed in a tip of a nozzle such that the downstream end of the fins is approximately flush with the nozzle tip discharge orifice.

Terms

The following use of terms is helpful in discussing the structure and performance of the instant inventions as they developed.

The term "riser" is used to refer to any pipe or line or system of such, affixed to or near or adjacent to an outer tank wall, installed to provide water, water and foam concentrate and/or fire fighting fluid to a top portion of a large industrial storage tank. Although risers are shown herein as vertical pipes, they could be any shape, and in particular, they could be a combination of vertical and/or circular portions. E.g. one or more fluid distribution rings could be installed around a tank, connecting with vertical riser portions. A riser can come in sections, as illustrated herein.

A "tip" of a nozzle is a nozzle barrel portion terminating in a discharge orifice, frequently including a swedge-down portion to enhance discharge pressure.

A "fin" (also referred to in the art as a vane) directs fluid flow in a conduit.

A "stream shaper" provides fins or vanes extending in a nozzle or conduit. A fin radial dimension is the dimension measured radially from a center axis of a barrel or conduit out toward the barrel or conduit wall. A fin longitudinal dimension is the dimension of the fin measured longitudinally in a nozzle or conduit, along a nozzle or conduit longitudinal axis or in the upstream/downstream direction of flow.

A "deflector," as used herein, provides an obstruction in a fluid conduit, directing a portion of fluid flowing therein toward a discharge orifice or port.

A tank "periphery" is an annular area on a top of a floating tank roof, between the tank wall and the floating roof "foam dam." Foam dams are usually 24 inches high or 12 inches high. A "rim seal fire" is a fire in the "periphery." (A full surface fire can ensue when a floating roof fails, e.g. sinks or tilts.)

An "aerated foam nozzle" or an "aerated foam projecting nozzle" will be used to indicate a nozzle that discharges foam created from a foaming concentrate that has passed through an ambient air aeration chamber located at, proximate to, and/or just prior to, a nozzle.

Two nozzles discharging "in roughly opposing directions" will be used to mean discharging in roughly opposite directions, within at least +/−15° of a median "directly opposite" directional axis. By one measure, thus, the included angle between two discharge axes of two nozzles discharging in roughly opposing directions, taken in the direction of discharge, will be between 180° and 150°.

A "substantially focused" stream indicates a discharge of foam where at least 60% of the foam remains within a 20 degree cone around a discharge axis during flight.

A "projecting" nozzle means a nozzle that, if set at 0° inclination to the horizon and at a supply pressure of 100 psi, and if a landing footprint is measured on a horizontal plane five feet below the discharge orifice, and when throwing aerated foam with an expansion of between 3/1 and 5/1, then the nozzle can land at least 50% of the aerated foam greater than 5 feet from the discharge orifice and can land some foam greater than 20 feet. "Projecting" thus means landing at least 50% of foam, aerated with an expansion of between 3-to-1 to 5-to-1, greater than 5 feet from the nozzle discharge orifice and landing significant foam greater than 20 feet, if discharged horizontally and measured on a plane five feet below the discharge orifice.

A "forcefully projecting" nozzle means a nozzle that, if set at 0° inclination to the horizon and at a supply pressure of 100 psi, and if a landing footprint is measured on a horizontal plane five feet below the discharge orifice, and when throwing aerated foam with an expansion of between 3/1 and 5/1, then the nozzle can land at least 50% of the aerated foam greater than 50 feet from the discharge orifice and can land some foam greater than 80 feet. "Forcefully projecting" thus means landing at least 50% of foam, aerated with an expansion of between 3-to-1 to 5-to-1, greater than 50 feet from the discharge orifice and landing some foam greater than 80 feet, if discharged horizontally and with a landing footprint measured on a horizontal plane 5 feet below the discharge orifice.

The concepts of "substantially focused" stream and "projecting" and "forcefully projecting" together with "aerated foam nozzle" help distinguish the instant inventive nozzle and wand systems from aspirated foam discharge devices of the prior art. Prior art discharges from traditional "foam chambers" or "foam pourers" are not "substantially focused" or "projecting." On the other hand, the term "aerated foam nozzle" distinguishes the instant nozzles from master stream nozzles of the prior art, for instance, nozzles that throw a water/foam concentrate liquid mixture where essentially all aeration takes place significantly after leaving the nozzle structure rather than in an associated upstream or in-nozzle aeration chamber.

Given the surprisingly good foam run results with the instant nozzle design and aerated foam, the inventors tested "opposing nozzle" fixed units, referred to by the inventors as "wand heads" and "wands." "Two nozzle" and "three nozzle" fixed units, or "wand heads" or "wands," were tested, discharging roughly horizontally and primarily left and/or right, and optionally, "toward the center." For insertion through existing openings in a wall of a "fixed roof" tank, a conduit with a single center pointing nozzle plus dual non-obtrusive side ports with interior deflectors was tested, the unit suitable for inserting into existing fixed roof tank wall flanged openings.

The "wand heads" are adapted to be supplied by "risers," mounted on, proximate to or about outside tank wall portions, the "wand heads" to be secured so as to discharge just inside a top tank wall portion, for enhanced reliability. The "wand heads" preferably include a proximally located ambient air aeration chamber providing properly aerated foam for the nozzle(s). The aeration chambers are served by water/foam concentrate line(s) or pipe(s), again typically referred to as "risers." A fixed wand head with two opposing nozzles preferably directs discharges roughly left and right, projecting aerated foam substantially horizontally and in roughly opposing directions. A fixed separate riser and fitting can be provided, especially proximate a tank ladder and landing platform, to supply and support an additional fixed nozzle or portable monitor and nozzle, which can project foam toward the center of the tank or otherwise around the tank. Preferably a "three nozzle" fixed unit for open floating roof tanks can be installed to discharge left, right and roughly toward the center. For fixed roof tanks, a single center pointing nozzle with two conduit-located deflection ports can be installed, the ports functioning as side nozzles. The unit can be inserted through flanged openings typically provided in existing fixed roof tanks. The single conduit nozzle plus two "deflector ports" can discharge left, right and toward the center of a tank with a fixed roof.

(The inventors further teach, for alcohol or the like liquids, possibly not discharging both left and right but alternately discharging all left or all right, to establish a swirl pattern run, and to further bank the discharge against the wall to minimize plunge.)

(Preferably in most embodiments a fourth smaller orifice will discharge a relatively small amount of aerated foam, say less than 150 gpm, directly down the tank wall to land and cover tank surface directly under the unit. Frequently this small fourth discharge port may not be mentioned herein, and in many cases it appears unnecessary. However, it will likely be included in commercial units out of caution.)

The instant system thus offers a cost effective solution to a costly and dangerous problem. Providing first responding fire fighters with a proper means for successful extinguishment of at least tank rim seal fires, and preferably also means for full surface vapor suppression and means for extinguishing full surface liquid tank fires, by strategically and permanently fixing a relatively few inexpensive components onto a tank, as well as providing supporting tools (monitors, nozzles, hose, and pumps,) should be paramount in considering how to best protect a hazard. Doing so ensures a good relationship with the first responders as well as provides a better solution to large tank hazards.

To recap and reflect on the development history, a Williams two stage "fully portable" attack for "rim seal fires," and even for "full surface liquid tank fires," has been successful. However, as required by the two stage "fully portable" attack, requiring humans to carry hoses up a tank ladder to the tank landing, and to charge the hoses around their feet in order to activate a primary system, presented a personnel risk that was not attractive. Unmanned or largely unmanned fixed systems presented a far more attractive personnel environment. However, any fixed or semi-fixed system must also approach the degree of reliability and flexibility and cost effectiveness as that provided by the two stage "portable" system.

A surprising discovery, that heightened the reliability, cost effectiveness and flexibility of the instant fixed systems, came with the testing of a landing footprint-enhanced, "aerated" foam nozzle "projecting" aerated foam. The aerated foam nozzle, with tight landing footprint-enhancement, tested to show that it could "throw" aerated foam significantly left and/or right while still landing a predominant portion of that foam in the narrow tank "periphery." Further, the nozzle could throw or project aerated foam successfully for a significant distance, e.g. at least 20 feet, while landing the foam predominately in the periphery. And the momentum of the "throwing" or the projecting enabled the system to "run" foam, tests showed, a surprising distance, 120 feet both left and right of the nozzle, and to do so very quickly. As a result, a footprint-enhanced aerated foam nozzle could form a suitable cost effective primary fixed means for at least extinguishing rim seal fires. To compare with the Williams prior "portable system," the prior portable foam wand was only used to establish a "beachhead" directly below the wand, which allowed humans to mount the tank wall at the wand position by the ladder and to put into place the primary fire extinguishing system, fed by hoses running up the ladder. To the contrary, with the instant novel fixed systems, a portable monitor and nozzle, if used, becomes secondary. A "fixed left and/or right wand" becomes the key element of the primary fire extinguishing system for the "rim seal fire." A further fixed center pointing nozzle covers a full surface fire.

Discussion of Other Discovered Teachings

The problem of an effective practical reliable design for a fixed fire extinguishing system for tank fires, especially in tanks of diameter of greater than 100 feet and 200 feet, has existed for a long time. Search into existing solutions uncovered the following.

Foam Chambers—for Example, Blomquist U.S. Pat. No. 3,876,010

For floating roof seal fires, "foam chambers" or "foam pourers," discussed above, dropping highly aspirated foam between a tank wall and a floater roof "foam dam" have been a traditional fixed fire fighting system solution. These systems are inadequate to attack a "full surface" fire in a >200 foot diameter tank and likely inadequate for >a 100 foot diameter tank. Their foam run is typically less than 50 feet, so that a large number of such chambers are required. Given the degree of expansion imparted to the foam, the foam run is slow and short and the gpm is limited. Applicant experimented with the common foam chambers to confirm that the run of their highly aspirated foam was only about 40-50 feet in each direction around the tank perimeter or periphery (e.g. in the area between tank wall and the "foam dam" on the floating roof.) And this 40-50 foot run was also relatively slow.

Saval and Knowsley

A "Saval" apparatus was noticed on the Internet and a similar Knowsley apparatus discovered. This apparatus type proposes two 45° down pointing nozzles, "discharging" left and right, stationed along the wall rim, (as well as a small directly downward discharge). The two 45° nozzles do not discharge "significantly horizontally" and no nozzle is proposed to discharge "toward the center" of the tank. Further Saval's nozzles appear to "bank" their discharges against the tank wall. The effect of banking could be to soften the impact of landing on the liquid and/or to direct more of the foam into the periphery and/or to heighten the aeration. However, one of skill in the art knows that the "banking" technique lessens the lateral force behind the foam, wastes projection energy and reduces foam run capability. Neither Saval nor Knowsley claim a novel or exceptional "foam run" capability. This implies that Saval's and Knowsley's foam run is in the same order as that of the traditional "foam chambers" and/or "foam pourers."

Uribe US Patent Publication No. US 2004/0140106

Uribe teaches a tank wall mounted fixed system nozzle with an aeration chamber. The degree of aeration is not mentioned. No stream shaper is disclosed. Uribe does not discharge right or left, but only toward the center, as with the Nihilator below. Uribe asserts that eventually his discharged foam will cover a whole tank surface. Since one of ordinary skill in the art knows that foam has a limited lifetime and a limited run, Uribe's statement implies that Uribe's tank is inherently of less diameter than 100 feet.

Nihilator

Reference to a Nihilator device was located, although the Nihilator appears to be no longer offered as a commercial product. One of ordinary skill might surmise that the Nihilator was not effective. The Nihilator is a center pointing nozzle apparently designed for a fixed roof tank and has an aeration chamber. The Nihilator discharges foam toward the center of the tank and suggests that it be used with traditional foam chambers.

Major Commercial Embodiments

The instant invention and its related embodiments have several major commercial embodiments. For ease of reference, the current major commercial embodiments are given graphic names Primary Target—Floating Roof but No Fixed Roof—Large Tanks "Point and Shoot" (Semi-Fixed) System—Useful for:
  Rim seal protection and fire fighting
  Full surface foam blanket when no fire exists, e.g. for sunken roof vapor suppression Advantages Each wand can protect up to 240' of seal rim circumference, as opposed to 40' or 80' with conventional foam chambers; therefore fewer wands are needed
  Portable monitor and nozzle provides back-up redundancy and vapor suppression capability
  Low costs, minimal installation "Ambush" (Fixed) System—Useful for:
  Full surface protection, rim seal fire and fully engaged full surface liquid tank fire (floating roof sunk)
  Number of systems per tank depends on tank diameter (and product stored)
  System can be used to extinguish rim seal rim fires with center nozzle valved off so as not to overload a floating roof Advantages Left/right/center (and possibly down-the-wall) streams can discharge and/or project aerated foam in 3 or 4 directions
  System capable of discharging 1900 gpm from each assembly on the largest model
  Each wand can protect up to 240' of seal rim and up to 150' toward the center
  Requires significantly fewer wand installations than prior art Primary Target—Fixed Roof, Large Tank "Hollow Point" (fixed) System—Useful for:
  Closed roof, full tank protection Advantages Easy installation on existing tanks, through existing single 6" flanged holes.
  Each wand can protect up to 240' of seal rim and up to 250' toward the center
  Incorporates a Teflon vapor seal to stop vapors from traveling down the tube and out aeration holes
  Can project 2700 gpm of foam total, via forward and left/right and down streams
  Requires significantly fewer wand installations than prior art Again, success of the above embodiments may be based in part upon the development of a stream shaper affixed in the tip of the nozzles, which facilitates providing a projecting and forcefully projecting foam nozzle, as well as developing a properly aerated foam for the context.

The Major Commercial Systems and Methodologies—in Greater Detail

The invention, as introduced and discussed above, relates to various aspects and embodiments for fixed and semi-fixed systems and methods for extinguishing liquid tank fires in large industrial storage tanks. The invention covers tanks with and without fixed roofs and systems that are fixed or semi-fixed, and systems developed primarily for rim seal fires and for full surface liquid tank fires.

The Semi-Fixed System (for Rim Seal Fire and Vapor Protection)—Point and Shoot, Summarized The Point and Shoot fixed wand and riser system is a semi-fixed system that can be used immediately for "rim seal fire" protection as well as for vapor suppression. The Point and Shoot fixed wand and riser system is predicated upon the successful rim-seal extinguishments made by Williams using fully portable equipment, as well as the subsequent Daspit Tool development. Given the further development of a proper aeration chamber and a stream shaped nozzle combination, aerated foam nozzle units, or "wands," fixed to the wall of the tank become a cost-effective primary "rim seal fire" extinguishing means. A further fixed riser, for supplying fire fighting fluid to a portable monitor and nozzle, can provide redundancy in case of damage to the primary system as well as extra full surface vapor suppression capability. (And of course, further independent fixed risers with fixed center pointing nozzles offer a fully fixed full surface fire protection capability.)

Thus, the semi-fixed Point and Shoot wand and riser system and method provides safer and quicker extinguishment for rim seal fires, as well as a back-up for component disablement or vapor suppression. This minimal fixed wand and riser system requires only strategically permanently affixing a few inexpensive components directly onto a tank. As a consequence of a proper combination of a footprint-enhanced nozzle with a properly aerated foam, the left and right nozzles of a wand can be fixed 220 to 240 feet apart, (as opposed to 40 to 80 feet apart with prior art foam chamber systems.) Thus, the footprint enhanced aerated foam nozzle wand system can be staged as a primary fire extinguishing system for the "rim seal fire" while one or more risers, installed proximate a tank landing and ladder for the quick attachment of portable monitor/nozzles, can be regarded as redundant backup rim seal fire protection, in case of damage to the primary system, and as a capability to provide full surface vapor suppression if a floating roof partially or totally sinks. This semi-fixed system permits attacking a seal fire quickly with much less risk to personnel.

The semi-fixed elementary system, called the Point and Shoot System, has a recommended layout as follows:

| Number of Foam Wands for Full Encirclement Seal Protection 240' Coverage From Each–24" Tall Foam Dam Required at least 220' coverage from each-12" tall foam dam | |
| --- | --- |
| Tank Diameter | No. of Foam Wands Required |
| 0'-76' | 1 |
| 77'-153' | 2 |
| 154'-229' | 3 |
| 230'-306' | 4 |
| 307'-382' | 5 |
| 383'-458' | 6 |
| Williams Fire and Hazard Control 1-800-231-4613 | |

Note: The number of prior art "foam chambers" which would be required to protect the above tank sizes is many multiples of the number of the instant novel "foam wands" required, due to the extended coverage of the instant "foam wands" (240' vs. 80' or 220' vs. 80').

The Point and Shoot semi-fixed system is particularly applicable for large tanks with no fixed roof for "rim seal fires" and full surface vapor suppression. A major advantage is low cost. The Point and Shoot system is characterized by a pair of aerated foam projecting nozzles attached together in a fixed "wand," structured to discharge in roughly opposing directions and roughly horizontally. The aerated foam tank wand has been demonstrated to be able to land and run foam approximately 120 feet in each direction in the tank "periphery," that is the space between the "foam dam" and the tank wall of a floating roof. See below test results. Preferably in addition to the fixed foam wands risers attached to or about the tank wall, at least one additional at least four inch riser is attached to the tank wall to be associated with the tank landing ladder system. The additional riser is structured to communicate fire fighting fluid from approximately the ground to approximately the top of the tank and is structured with a fitting at its end, proximate the top of the tank, the fitting suitable for attaching a portable (at least 150 gpm at 100 psi) monitor and nozzle.

The Fixed System for Floating, not Fixed, Roof—Including Full Surface Fire—Ambush Summarized One new primary danger arises from the fact that industrial storage tanks for storing flammable liquids and hydrocarbon products are being constructed of ever greater diameters. Today 405' diameter tanks, and greater, are being constructed. Large scale portable fire fighting nozzles, such as 10,000 gpm, 12,000 gpm or 14,000 gpm nozzles, capable of throwing fire extinguishing and hazard suppressing liquids (water and foam concentrate) over the top of the tank wall typically recite maximum ranges in the 400-500 foot range. Fire fighting foams from the large scale portable nozzles can be relied on to run, at best, approximately 100'. (Conservatively, the foam might only be reliably counted upon to run about 80 feet.) Thus, portable fire fighting nozzles effectively addressing a full surface, fully engaged flammable liquid tank fire in a 405' diameter tank by throwing foam over the wall from an upwind location probably have to be staged within 100' of a tank wall. Considerations of logistics as well as the existence of moats, buildings and other equipment and piping around the tanks, and especially considerations of heat and personnel safety, render extremely problematical any tactic requiring approaching a fully engaged full surface liquid tank fire in a 405' diameter tank closer than 100'.

Further pressure for improvement comes from the fact that the value, to the tank owner, of a gallon of the product in the tank is also increasing dramatically. Owners of large tanks and of large tank products want the product and the tank to be protected from fire.

The above considerations incentivized the inventors to develop a fully fixed system, including one or more fixed center pointing nozzles plus an aerated foam wand, preferably a left and right discharging wand but possibly an all left or all right discharging wand. The system is known as the Ambush and provides a first defense for addressing fire and vapor hazards, including full surface liquid tank fires, in all tanks without a fixed roof, but especially in large diameter tanks.

The Ambush could be implemented in one fashion as a "fixed" Point and Shoot System. The Point and Shoot riser provided with a fitting for attaching a portable monitor and nozzle, located near the tank ladder and landing, could be provided instead with a permanently fixed center pointing nozzle, such as a master stream self-educating nozzle. The riser and nozzle could look and function much like the Hollow Point riser and nozzle, without however the lateral space constraints, the side ports and without the necessity of an aeration chamber. The adjustment of the nozzle could be fixed or set with respect to the tank size and other fixed wands such that the nozzle covers a relevant center portion of the tank surface with foam. No separate ambient air aeration chamber would be required, as known in the master stream fire fighting nozzle field. A separate fixed riser and nozzle need not be limited to being located near a tank ladder and landing. Only so many fixed center directed riser and nozzles need be included as will adequately cover the center portion of the tank surface with foam, in context.

An Ambush System provides a tailored design of three nozzle units, or wands, preferably with all nozzles using one or two proximate ambient air aeration chambers and all working off of one or two associated risers. These three nozzle units are designed to be installed as units around a tank.

The three nozzle, fixed, aerated foam wand system includes a set of fixed aerated foam nozzles. This set of nozzles, each referred to as a fixed "wand," has left and/or right and over the top (toward the center) capability, all with enhanced landing footprints. Preferably the units of three nozzle wands are spaced around, and proximate to, the inner tank wall, each unit preferably providing two nozzles that discharge predominantly left and right, along inner tank wall portions, and a third nozzle that discharges toward the center. Preferably the "toward the center" nozzle discharges at least beyond an approximate 80' annular ring of foam, anticipated to be created upon an open tank surface by the left and right discharging nozzles. (In some cases the three nozzle wand unit also provides a fourth small port or nozzle to discharge directly beneath the wand and on the inside of the tank wall.) Any disablement of a fixed wand due to a particular fire or hazard or incident can be supplemented by large portable nozzles staged on the ground, throwing foam over the tank wall, as is known in the art.

The perimeter of a 405' tank runs approximately 1,250 feet. Testing shows that the instant novel fixed foam wands (Ambush System) should be able to direct foam to run at least 80' to 90' in each direction, preferably 120 feet, and to also run the foam 80' or so inward toward the center of the tank. (Again, in addition, a small amount of foam may be discharged directly below the fixed foam wands.) These nozzles could cover the inner tank wall with a roughly 80' wide annular foam ring, relatively quickly. A third nozzle attached to each fixed wand, preferably with its own aeration chamber, projects foam toward the center of the tank and at least toward the inside of the 80' annular foam ring being established. Preferably, for a large tank, the third nozzle lands a footprint of foam with a footprint midpoint approximately 90 to 120 feet radially inward of the tank wall. The length of the landing footprint should preferably extend at least 20 to 30 feet forward and backward from the landing midpoint, along the discharge projection line. The landing footprint should preferably spread at least 15 to 20 feet laterally from the discharge projection line. Such a discharge of foam has been shown to be capable of running foam toward and through the center of a 405' diameter tank. Taking the center projected foam together with the peripherally discharged foam, a total gpm of foam should be selected such that the surface of the tank would be covered with an adequately deep and lasting foam blanket. That is, the gpm of the wands and nozzles should take into account the desired and/or required application rate density for the tank surface.

This fixed three nozzle open system and methodology has an advantage of concentrating a foam blanket on portions of the tank liquid surface adjacent to the tank walls. The portions adjacent to the tank walls are important because the tank wall itself can retain significant heat. The tank wall typically needs the most cooling. For a 405 foot diameter tank, for instance, seven or eight large three nozzle fixed foam wands might be utilized, each large three nozzle foam wand discharging approximately 2,000 gpm of water/foam concentrate total from its nozzle cluster. In a preferred embodiment a nozzle discharging to the left and to the right might discharge approximately 700 gpm each. A nozzle directed toward the center might project approximately 500-900 gpm toward the center. A small port discharging immediately under the fixed wand might discharge approximately 100 gpm downward.

Again, to the extent that one or more fixed foam three nozzle wands are disabled by the fire or an explosion, large portable fire fighting nozzles can be staged on the ground and used to supplement the non-disabled portions of the fixed system.

In the three nozzle fixed aerated foam wand system the discharge orifices for the nozzles preferably contain fins, or stream shapers, to minimize the turbulence in the discharge of aerated foam out of the nozzles. Minimizing turbulence enhances the range and the run of the foam, and tightens the landing footprint.

One preferred three nozzle fixed aerated foam wand embodiment includes two aeration chambers. The aeration chamber(s) typically consist of tubular jets inserted inside of piping proximate a series of air intake ports, and the chamber is situated proximately upstream of the nozzle discharges. The jets, in a known manner, create a low pressure zone, sucking air in through the ports and mixing the water/foam concentrate with air to create an aerated foam for discharge. Bends incorporated in the conduit between an aeration chamber and a discharging nozzle may enhance the aeration of the foam. No bend may be included between an aeration chamber and a center projecting nozzle, however, to minimally aerate that foam in order to enhance foam throw and run. Discharge from that nozzle has a longer flight time in which to further aerate. Two aeration chambers enable tailoring the aeration more closely to the nozzle purpose.

Although the three nozzle system was initially designed to address the problem of a very large, fully engaged, full surface liquid tank fire (no fixed roof), such as a fire in an industrial tank having a diameter of 405 feet, the fixed three nozzles aerated foam wand system was quickly seen to have application to tanks of all diameter sizes, and in the situation of either a fully engaged fire or a rim seal fire or simply a need for vapor suppression. The large fixed wand is useful even if a floater remains in place and there is only a seal fire or a need for vapor suppression over the floater. A valve can be provided to eliminate foam discharged toward the center in the case of a rim seal fire.

Fixed Roof Fixed Nozzle System—Hollow Point Summarized

A fixed roof fixed nozzle wand system has been designed as a direct response to the issues faced by foam chambers when installed on a closed roof tank for the purpose of full surface protection. One wand of the instant fixed roof fixed nozzle system projects foam directly toward the center of the tank as well as left and right to protect near the inner tank walls. The wand unit preferably incorporates a Teflon vapor seal to prevent tank vapors from escaping the tank via the aeration holes in the wand system's supply piping.

In contrast with foam chambers that simply pour foam onto the surface from the circumference of a tank, such that the foam must run across the liquid surface using only gravity as its means of propulsion via the static head from the piled up foam near the tank wall, the instant fixed roof aerated foam wand discharge head projects foam out into the tank with significant velocity, to push the foam toward the center of the tank. From the same wand foam from interior left/right discharge ports is projected to protect the area near the tank walls.

As foam accumulates in the center, it will begin to flow outwards back toward the tank walls. The foam at the tank walls will meet and flow toward the center of the tank, closing the gap between the two.

Each fixed roof wand discharge head is preferably designed to flow 1000 gpm; 600 gpm is delivered through the center stream projecting toward the center of the tank with 200 gpm projecting left and right against the tank wall. This flow rate can be regulated by an internal jet just upstream of the aeration holes. Air is introduced to the stream at the aeration holes by the Venturi effect created by the internal jet. This aerates the foam before it leaves the wand to allow for aerated foam to land on the liquid surface. The ambient air aeration chamber is preferably intended to create a relatively low expansion foam compared to other devices, in order to maintain small bubble foam. This foam is best suited for quickly and effectively running across a liquid surface, thus providing a quick coverage and extinguishment of the tank. One main objective of the fixed roof wand system is to improve upon current methods of closed roof storage tank protection. The fixed roof wand system does so by projecting foam, rather than pouring foam, and by carefully engineered discharge tip sizes and designs coupled with an efficient ambient air aerator and favorable flow rates, stream shapers and stream straighteners.

One fixed roof wand system recommended layout, for example, is as follow:

Number of Hollow Point Systems Required for
Full Surface Protection
1000 gpm Discharge from Each System

| Tank Diameter | Discharge Heads Required |
| --- | --- |
| 0'-103' | 1 |
| 104'-146' | 2 |
| 147'-178' | 3 |
| 179'-206' | 4 |
| 207'-221' | 5 |
| 222'-242' | 6 |
| 242'-262' | 7 |
| 263'-280' | 8 |
| 281'-297' | 9 |
| 298'-313' | 10 |
| 314'-316' | 11 |
| 317'-330' | 12 |
| Williams Fire and Hazard Control 1-800-231-4613 | |

Note:
The application densities used in the above calculations are based upon an escalating scale from .12 gpm/ft^2 to .14 gpm/ft^2. These numbers are based upon Williams experience with extinguishing large full surface storage tank fires.
Special Methodology-Alcohols Alcohols and related liquids and polar solvents are known to attract water out of foam bubbles. Foam, therefore, is preferably landed "lightly" on alcohols or like fluids to minimize the depth of any plunge of the foam below the liquid surface. The inventors teach that a swirl pattern may be preferable for running foam landing on alcohol or the like liquids in the case of fire. Thus the inventors teach, for tanks of alcohol or related liquids or polar solvents, a method of banking discharged foam against inner tank walls prior to landing the foam on the liquid, and discharging the foam predominantly all left or all right, from a plurality of nozzles, to develop a swirl pattern run for the foam in the tank.
Aerated Foam The preferred foam for producing the requisite aerated foam for the instant fixed systems is to use an ambient air aeration chamber located just upstream of the nozzles. It is known in the art to produce an aeration chamber just downstream of the nozzle discharge orifice gap. In this sense the word nozzle is used to reference the portion of the barrel that contains the gap, or the swedging down to the narrowest orifice, thereby recovering the greatest head pressure for discharge. Such nozzle discharge orifice gap can discharge into an aeration chamber where aerated foam is produced and is then discharged from the aeration chamber into the atmosphere. U.S. Pat. No. 5,848,752 to Kolacz, in particular FIG. 3, illustrates this type of foam aeration nozzle. Also, U.S. Pat. No. 4,944,460 to Steingass illustrates this type of aeration foam nozzle. All things being equal, a separate aeration chamber upstream of the nozzle gap is preferred. However, one of skill in the art would recognize that such is not the only way to create aerated foam.

Summary of Major Commercial Embodiments

The Point and Shoot system, at a minimum, includes installing a one or two nozzle aerated foam wand system, as a fixed system, preferably every 100' to 240' around the perimeter of a tank, which should be sufficient to extinguish tank "rim seal fires."

A good reason for also installing at least one fixed riser proximate a landing, for releasably affixing a portable monitor and nozzle, together with the above one or two nozzle system, would be to provide redundancy and backup foam protection, in case some fixed system units were damaged due to an explosion, and to provide as well a full surface foam "blanket" for "vapor suppression" should a floating roof of the tank sink. Such a fixed monitor riser would have a fire department connection at the bottom of the tank and a monitor quick disconnect fitting at the top. During an event, if needed, a firefighter could carry a lightweight aluminum monitor and nozzle to the top of a tank and install the monitor on the riser pipe using the quick disconnect fitting (approximately 2 minute installation). From this vantage point, the fire fighter could directly apply foam to needed areas. This maximizes the effectiveness of the resources available to the firefighter. The danger and hazard from laying fire hoses up a ladder on the side of the tank to implement a portable system are avoided. Williams recommends installing a fixed monitor riser pipe at locations near landings of the tank. This fixed monitor riser pipe could also be used to apply foam if necessary to any exposed areas due to a "cocked" roof or in the event a foam wand head has been compromised due to an explosion. This elementary semi-fixed system minimizes initial capital investment for protection of a tank without a fixed roof, at least from a rim seal fire and a sunken roof, while providing a proven system that is easy to operate and to maintain. The equipment eliminates the need to drag multiple hoses up a tank's ladder which impedes firefighters from getting onto or off of the tank quickly.

The Ambush system is a fixed system particularly applicable for full surface liquid tank fires and/or rim seal fires, including in large tanks, again as above, preferably for tanks without a fixed roof. The Ambush system preferably includes three nozzle aerated foam wands, with two nozzles that discharge in roughly opposing directions and that can be oriented with respect to a tank to discharge roughly horizontally. The third nozzle projects in a direction roughly perpendicular to the discharge axis defined by the first two nozzles. When oriented with respect to the tank, the third nozzle projects roughly toward the center of the tank with an appropriate angle of inclination. The third nozzle is preferably structured to land aerated foam at least 100 feet distant. All three nozzles significantly directionally project aerated foam.

The Hollow Point system is a fixed system particularly applicable to hazards and fire in large tanks with a fixed roof, and preferably can be installed in and through existing upper tank wall openings. The Hollow Point system is characterized by a conduit ending in a nozzle tip, the conduit having two side discharge ports with associated, largely interior "deflectors." The ports, conduit and nozzle are structured to pass through existing tank wall openings and to be oriented with the ports discharging in roughly opposing directions, roughly horizontally, and the nozzle tip discharging roughly toward the center. Both the nozzle and ports preferably discharge a substantially focused stream.

The heightened projection capability and foam run capability of each system described above results in the installation and servicing of significantly fewer units per tank than with previous fixed systems. The new systems can protect significantly larger tanks with less fixed equipment and in less time. A stream shaper installed in the tip of the nozzles contributes to the heightened projection capability of the nozzles, and together with the development of a properly aerated foam, produces a focused stream and optimized foam run.

Testing

As discussed above, the current accepted fixed system for protecting storage tanks comprises "foam chambers" (sometimes called "foam pourers.") Fixed foam chambers have limitations, one main limitation being their method of applying foam to a seal area. Either because of (1) the degree of aeration produced by the foam chamber and/or (2) a perceived delicacy of the foam bubble and/or the (3) dispersed footprint discharged, the chamber is structured to only gently "pour" a greatly expanded foam down onto a tank's seal. The foam chamber pours; it does not throw or project. The foam chamber relies on gravity and the head created by the pile of foam to push the foam left and right of the foam chamber. This system severely limits the distance the foam can "run," left and right of the foam chamber in the seal rim periphery area. This system requires a tank to have a large number of foam chambers spaced around the circumference, every 40 or 80 feet, depending upon whether the "foam dams" of the floating roof are 12" or 24". Many tanks are now greater than 300 foot diameter. Some are greater than 400 foot diameter. A 400 foot diameter tank with a 12" foam dam would require about 23 traditional foam chambers to protect the periphery. The instant invention requires only about 6 units to protect the same periphery.

In contrast with the currently accepted fixed systems, Williams has developed an improved aerated foam nozzle system to discharge a proven effective foam surprisingly farther, many times farther, in both left and right directions, than traditional foam chambers. Tests show, below, that the instant system covers a larger area in less time with foam that effectively extinguishes fire. Further, a rim mounted nozzle has been also demonstrated that can run foam to the center of a 400 foot diameter tank.

In December of 2010 a "proof of concept" test was run at the Williams Fire and Hazard Control test facilities. The purpose of the test was to compare and contrast, by observation, two foam application devices flowing into a simulated tank "rim seal periphery area," the ones between a tank wall and a floating roof "foam dam."

The purpose of the test was to determine whether the relative foam flow performance of the novel Williams projecting foam wand could provide the anticipated benefits compared to a conventional "foam chamber." Foam from both devices was discharged into a simulated floating roof "periphery," the ones between a tank wall and a floating roof foam dam. For each device the foam traveled through this simulated wall/foam dam "periphery" to reach and extinguish a liquid hydrocarbon pan fire, which was simulating a storage tank floating roof "rim seal fire." Flow rates and distances were recorded as elements of performance along with the delivered foam quality, foam expansion ratio and drain time.

The concept being tested was whether the foam applied through a high flow rate projecting foam wand would cover the distance in the seal area more rapidly and protect a larger segment of a floating roof seal along the periphery.

The observed test confirmed the concept. Foam from the projecting foam wand traveled 3 times the distance (120 feet versus 20 feet) in 25% less time (74 seconds versus 101 seconds from the chamber.) Both successfully extinguished a pan fire at their terminus. The novel foam wand applied foam more rapidly on the target area than the conventional foam chamber. In addition, the novel foam wand provided a gpm per square foot application rate 50% greater (0.6 versus 0.4 US gpm per square foot) than the foam chamber. Simulated periphery dimensions were 2 four inches wide and 2 four inches deep.

To summarize the test and the results, a novel aerated foam nozzle was set up on a mock seal area with a foam dam and flowed alongside a traditional foam chamber. The NFPA recognized maximum distance for a traditional foam chamber to cover is 80' total, 40' to the left and right, for a 24" foam dam. The traditional foam chamber was able to cover this distance in 1 minute 40 seconds. The novel aerated foam nozzle was able to cover an area three times greater in significantly less time. The aerated foam nozzle covered an area of 240' (120' to the left and right) in 1 minute 14 seconds. It was shown that foam applied through the novel high flow rate wand projecting left and right would cover a foam dam seal area more rapidly, travel further per device, and protect a larger segment of floating roof seal along the periphery.

Further testing of a fixed Hollow Point wand, discussed above, showed that a roughly 80'×170' pond of water (13,600 square feet) could be covered in foam with a Hollow Point wand in approximately 1 minute and 25 seconds. The furthest corner of the tank from the nozzle was 145' away. That furthest corner received ample foam coverage. The speed, run and authority of the foam was surprising.

Testing of the center nozzle of the Ambush wand, discussed above, also indicated a capacity to achieve an approximately 150' end range of a center nozzle landing footprint with the mid-point of the landing footprint at about 130'.

In August 2011 a full Ambush system was tested on a 277 foot diameter empty tank. Six three nozzle wand units were spaced around the periphery of the tank. The total flow per device was 1500 gpm giving a total system flow of 9,000 GPM. The measured footprint size of the center pointing nozzle was approximately 60 feet long by 20 feet wide with a mid-point range of approximately 90' away from the nozzle. By observation, the total surface of the tank floor was covered with foam. Photographs show testers wading knee deep in foam toward the middle of the tank.

SUMMARY OF THE INVENTION

The invention includes a nozzle for projecting fire fighting foam in a substantially focused stream particularly for use with fixed or semi-fixed systems. The invention preferably includes a nozzle structured for projecting at least 100 gpm (at 100 psi) of aerated foam, the nozzle having a tip portion defining a longitudinal axis and terminating, in contain preferred embodiments, in a solid bore discharge orifice. The tip portion has a stream shaper. The stream shaper can include at least four fins with a longitudinal dimension in the tip portion greater than a radial dimension in the tip portion and with the fins terminating substantially flush with a nozzle tip solid bore discharge orifice.

The invention also includes a nozzle for projecting fire fighting foam in a substantially focused stream including a nozzle structured for projecting at least 100 gpm (at 100 psi) aerated foam, the nozzle having a tip portion defining a longitudinal axis and terminating in a discharge orifice that is not necessarily a solid bore. This tip portion preferably has a stream shaper having greater than four fins, the four fins having a longitudinal dimension in the tip portion greater than twice a radial dimension in the tip portion, with the fins terminating substantially flush with the nozzle tip discharge orifice.

Preferably a focused stream, aerated foam projecting nozzle is proximately attached downstream of, and in fluid communication with, an ambient air aeration chamber. Preferably an ambient air aeration chamber, in combination with a nozzle, is structured to project foam with an expansion of between 2-to-1 to 8-to-1, and more preferably, with an expansion of between 3-to-1 to 5-to-1.

Preferably at least one aerated foam projecting nozzle is attached proximate the top of an at least a 100 foot diameter industrial tank wall and placed in fluid communication with a riser attached to, or proximate to, the at least 100 foot diameter industrial tank wall.

The invention preferably includes a wand having at least one aerated foam projecting nozzle for projecting foam in a substantially focused stream and in a roughly horizontal direction around an inside tank wall surface. The invention can include a first ambient air aeration chamber located upstream of, proximate to and in fluid communication with at least one aerated foam projecting nozzle, the aerated foam projecting nozzle having at least four fins and a tip portion, the fins having a longitudinal dimension greater than a radial dimension and terminating substantially flush with a nozzle tip discharge orifice. The aeration chamber is preferably structured together with a nozzle to project at least 100 gpm of aerated foam (at 100 psi) having an expansion of between 2-to-1 to 8-to-1. The nozzle and chamber are preferably attached to a riser for communicating water and foam concentrate and the at least one nozzle and riser are preferably structured in combination for attachment to a tank wall of at least 100 feet diameter such that the nozzle projects foam in a roughly horizontal direction around an interior top tank wall surface.

The invention can include a wand having at least one aerated foam projecting nozzle for projecting foam in a substantially focused stream in a roughly horizontal direction around an inside tank wall surface and a first ambient air aeration chamber, located upstream of, proximate to and in fluid communication with the at least one aerated foam projecting nozzle, the nozzle structured for projecting aerated foam in a substantially focused stream. The chamber is preferably structured together with a nozzle to project at least 100 gpm of aerated foam having an expansion of at least 2-to-1 to 8-to-1. The nozzle and chamber are preferably attached to a riser for communicating water and foam concentrate and the at least one nozzle and riser are preferably structured in combination for attachment to a tank wall of an at least a 100 foot diameter tank such that the nozzle projects foam in a roughly horizontal direction around an interior top tank wall surface.

Preferably the invention includes two aerated foam projecting nozzles, the two nozzles structured in combination to project in roughly opposing directions. Preferably the aeration chamber and nozzles are structured together to project aerated foam with an expansion of between 3-to-1 to 5-to-1.

Preferably a wand system includes an at least two inch riser structured to extend from proximate a ground location to a wand head located proximate an at least 45 foot high industrial tank top wall portion, and the system includes a plurality of such wands attached around the tank wall at at least 150 feet apart, or at at least 200 feet apart or at at least 220 feet apart or at least 240 feet apart.

Preferably included with a wand system is an at least four inch riser located proximate the tank wall having either a fitting for attaching a portable monitor and nozzle or having attached a fixed nozzle. A portable monitor and nozzle and/or fixed nozzle can provide a center pointing nozzle for discharging aerated foam toward the center of the tank.

The invention preferably includes a method for projecting a substantially focused stream of aerated foam that includes supplying water and foam concentrate to an ambient air aeration chamber proximately attached upstream of, and in fluid communication with, a fire fighting nozzle. The invention can include projecting aerated foam with an expansion of between 2-to-1 to 8-to-1 from the nozzle in a substantially focused stream, the nozzle having a tip with at least four fins, the fins having a longitudinal dimension greater than a radial dimension, and the fins terminating substantially flush with a nozzle tip solid bore discharge orifice.

The invention also preferably includes a method for projecting a substantially focused stream of aerated fire fighting foam that includes supplying water and foam concentrate to an ambient air aeration chamber proximally attached upstream of, and in fluid communication with, a fire fighting nozzle and projecting aerated foam with an expansion of between 2-to-1 to 8-to-1 from the nozzle in a substantially focused stream. The nozzle preferably has a tip with greater than four fins, the fins having a longitudinal dimension greater than twice a radial dimension and terminating substantially flush with a nozzle tip discharge orifice, which is not necessarily a solid bore.

The method preferably includes projecting foam with an expansion of 3-to-1 to 5-to-1 and projecting foam into an at least 100 foot diameter industrial tank from a position proximate a top tank wall portion, and wherein the nozzle is attached to a riser proximate the tank wall.

The invention can include a method of providing fixed wands around a tank wall for projecting foam against interior tank wall portions as well as providing risers and one or more center pointing nozzles for projecting foam toward the center of the tank.

BRIEF DESCRIPTION OF THE DRAWINGS

A better understanding of the present invention can be obtained when the following detailed description of the preferred embodiments are considered in conjunction with the following drawings, in which:

FIG. 5 illustrates, with cross section, a further embodiment for a wand head with center pointing nozzle for projecting fire fighting foam including a riser portion and an ambient air aeration chamber.

FIG. 6 illustrates the embodiment of FIG. 5 attached to a tank wall portion and retrofitted to an existing tank with a fixed roof.

FIGS. 7A-7F are drawing sheets for the embodiment of FIG. 2, giving a general overview for a foam wand together with detailed drawings of various parts of a foam wand system.

FIGS. 8A-8M provide drawing sheets for a wand head as in FIG. 2 and FIG. 7, with various parts identified, including nozzle parts and a stream shaper and an ambient air aeration chamber.

FIG. 9 illustrates portions of a free standing riser to be attached proximate to an industrial tank wall and suitable for servicing a nozzle or nozzle and monitor. In this embodiment the riser is broken into a top riser top portion, a riser extension pipe and a riser inlet pipe.

FIG. 10 illustrates a riser foot rest for a lower end of a riser.

FIGS. 13A and B provide drawing sheets for a point and shoot system including a wand and a free standing riser with a portable monitor and nozzle attached.

FIGS. 14 and 15 give a side view and a view from inside the tank of the point and shoot system of FIGS. 13A and B, including the wand with a pair of aerated foam nozzles discharging in roughly opposing directions and an independent riser having a portable monitor and nozzle attached.

FIGS. 17, 18 and 19 relate to the deployment of the point and shoot system. FIG. 17 illustrates the ladder around a typical tank leading up to a tank landing. FIGS. 18 and 19 provide an estimate of the number of foam wand location needed for full encirclement seal protection assuming a 24 inch foam dam on the floating roof or a less than a 24 inch foam dam on the floating roof.

The drawings are primarily illustrative. It would be understood that structure may have been simplified and details omitted in order to convey certain aspects of the invention. Scale may be sacrificed to clarity.

DETAILED DESCRIPTION OF THE PREFERRED EMBODIMENTS

Figure 1A:
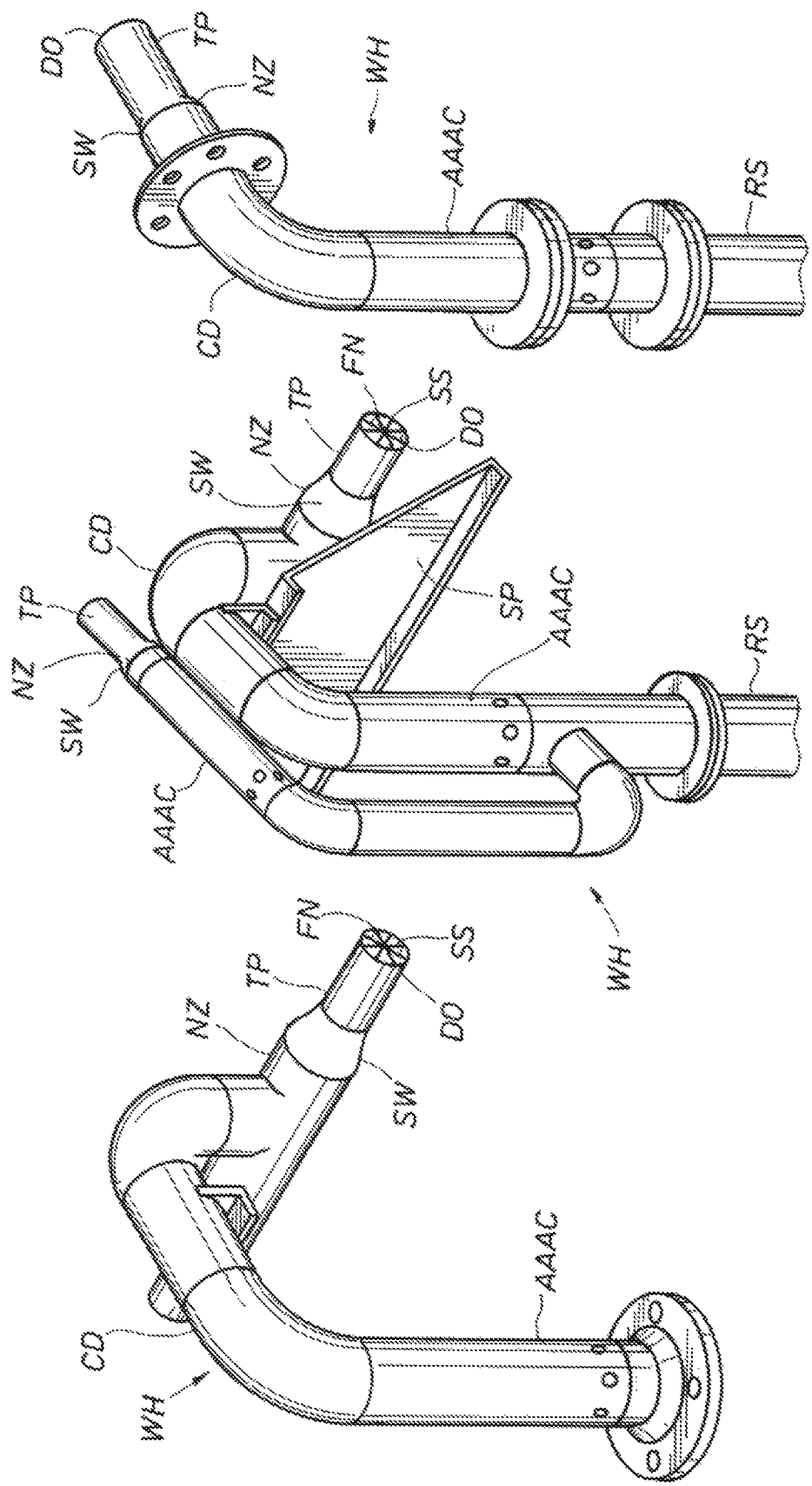
FIG. 1A illustrates three "wand head" embodiments with nozzles for projecting fire fighting foam in a substantially focused stream and aeration chambers.

FIG. 1A illustrates three embodiments of a wand head WH with one or more nozzles NZ for projecting fire fighting foam in a substantially focused stream. Each nozzle NZ has a tip portion TP defining a longitudinal axis. The embodiments of FIG. 1A all terminate in a solid bore discharge orifice. The tip portion TP of each nozzle NZ has a stream shaper SS comprised of fins FN.

As is common in the industry each nozzle includes a swedge-down area SW for recovering head pressure in order to enhance the range of the discharge.

The nozzle of these preferred embodiments utilize a solid bore discharge orifice DO. However, it is anticipated that roughly equivalent nozzles can be constructed using an annular bore discharge nozzle. An annular bore discharge nozzle is illustrated in principle in FIG. 1C. An annular bore discharge nozzle is created by a deflector or bafflehead BH placed in a fluid flow conduit. The deflector or bafflehead creates the swedge-down effect for the recapture of head pressure for discharge, and the nozzle "gap."

The three wand head embodiments of FIG. 1A illustrate one or more nozzles NZ, typically connected to a conduit CD, and thence to an upstream ambient air aeration chamber AAAC. A support plate SP is illustrated as one means of helping to affix the foam projecting nozzles to a top portion of an industrial tank wall at a desired height.

FIG. 1A also briefly illustrates connection of a wand head WH with one or more nozzles to a riser portion RS. The riser RS is simply a pipe or a line or the like used to bring water and foam concentrate up the tank wall to the wand head and the nozzles.

Figures 1B, 1C:
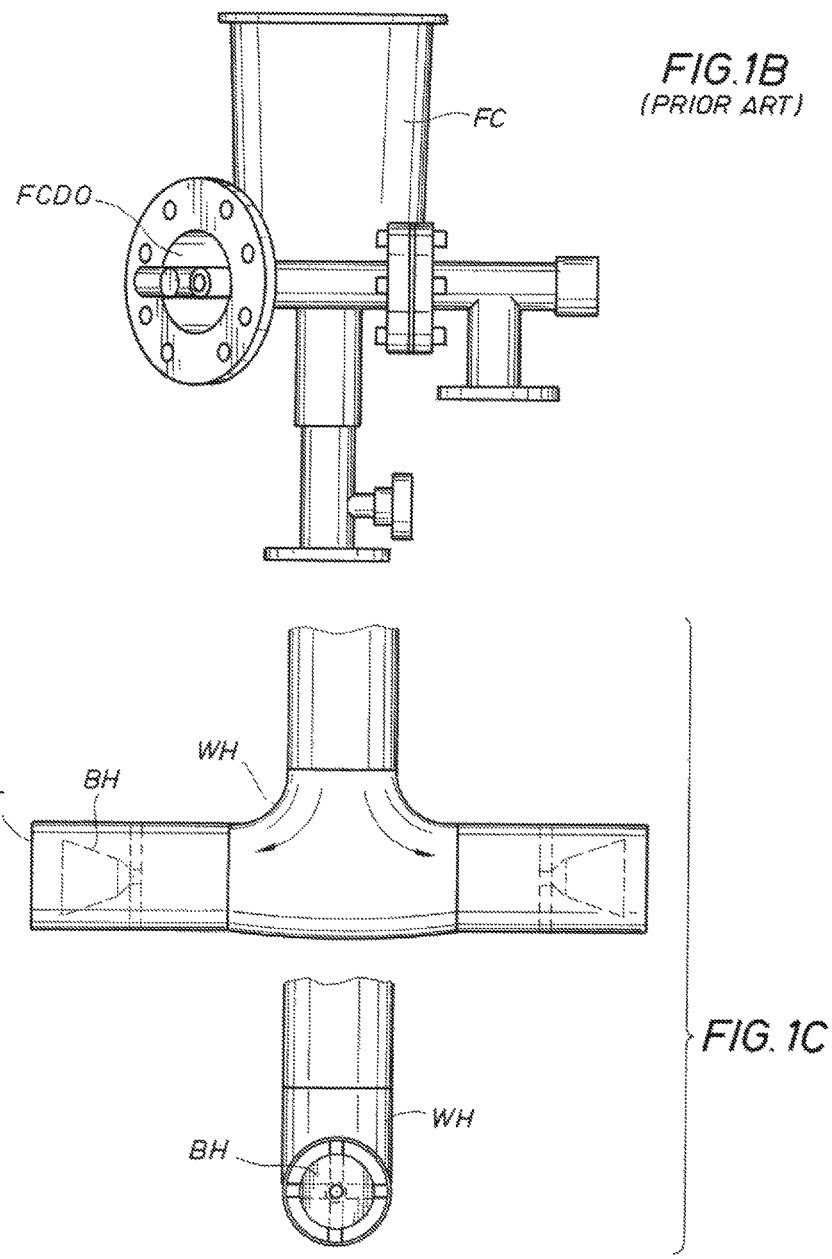
FIG. 1B illustrates a prior art foam chamber, for contrast.
FIG. 1C illustrates an alternate embodiment for a fire fighting nozzle wherein the discharge orifice comprises an annular discharge orifice (no stream shaper shown.)

FIG. 1B illustrates a prior art foaming chamber FC with a typical "pouring" foaming chamber discharge orifice FCDO.

As discussed above, FIG. 1C illustrates a wand head with projecting nozzles having not a solid bore discharge orifice but an annular discharge orifice, created by a deflector baffle head BH.

Figure 2:
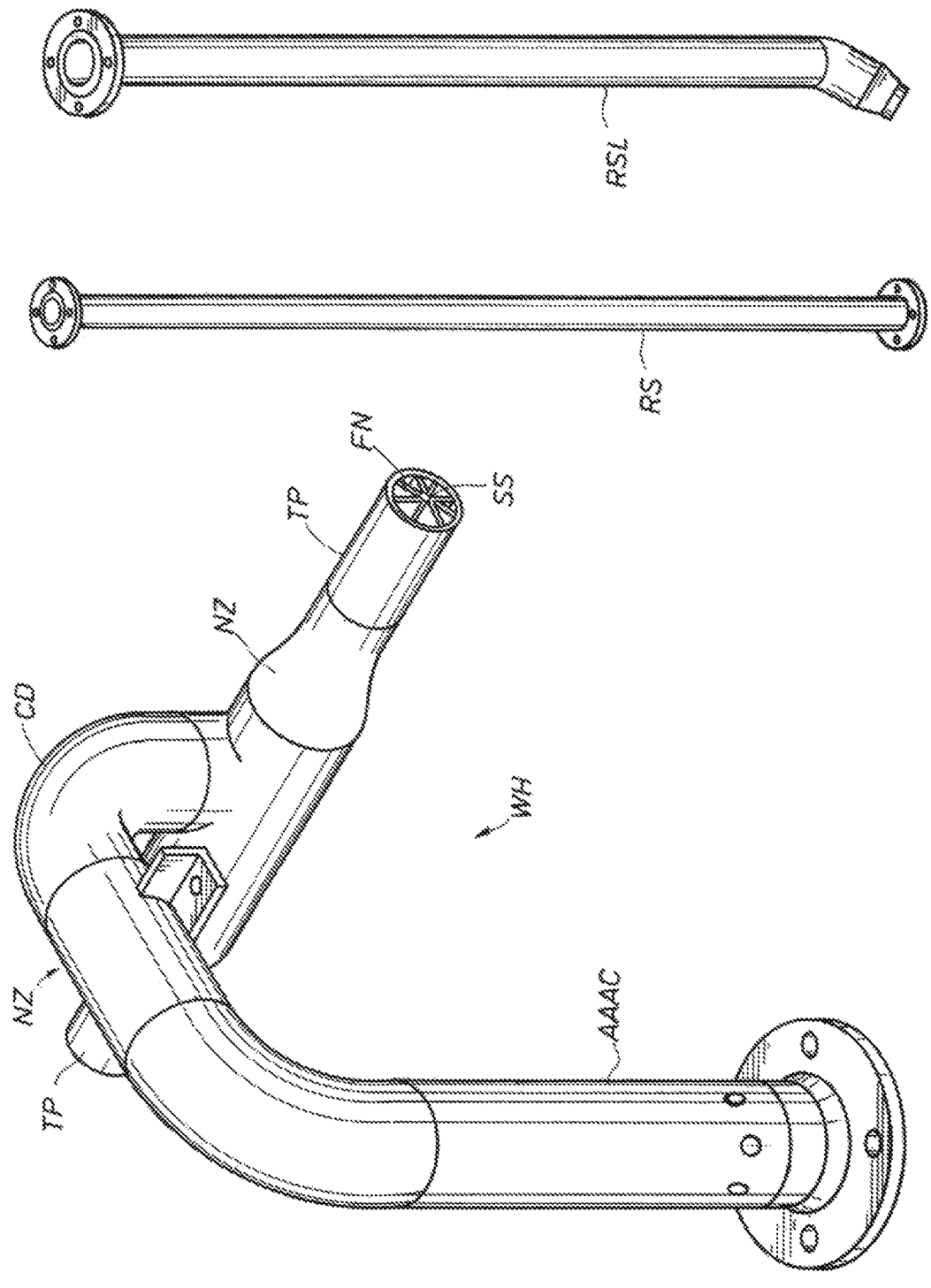
FIG. 2 illustrates an embodiment of a 3 inch foam wand head having two nozzles for projecting fire fighting foam in roughly opposing directions, together with associated riser portions.

FIG. 2 illustrates in greater detail a three inch wand head WH comprising a combination of a pair of nozzles NZ, each with a tip portion TP, each tip having a stream shaper SS. The pair of nozzles are connected by conduit CD to an ambient air aeration chamber AAAC. Also in the drawing is a riser pipe RS (in two sections) that can be connected to the lower portion of the wand head. An inlet pipe RSL is illustrated that can be connected to an upper portion of the riser pipe and provide a connection to water and foam concentrate hose or piping.

Figure 3:
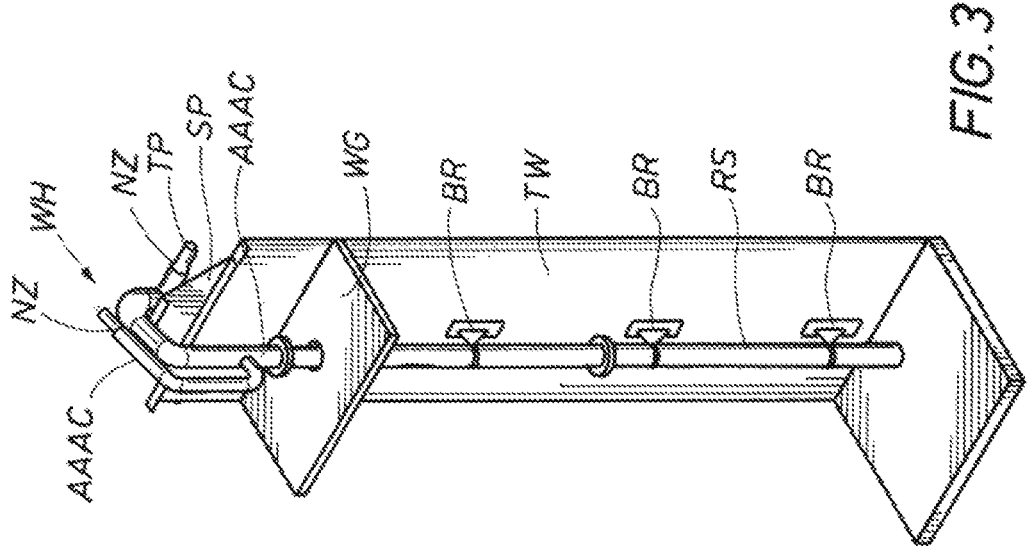
FIG. 3 illustrates a further embodiment of a wand with a wand head attached to a riser, the wand head and riser being attached to a tank wall.
Figure 4:
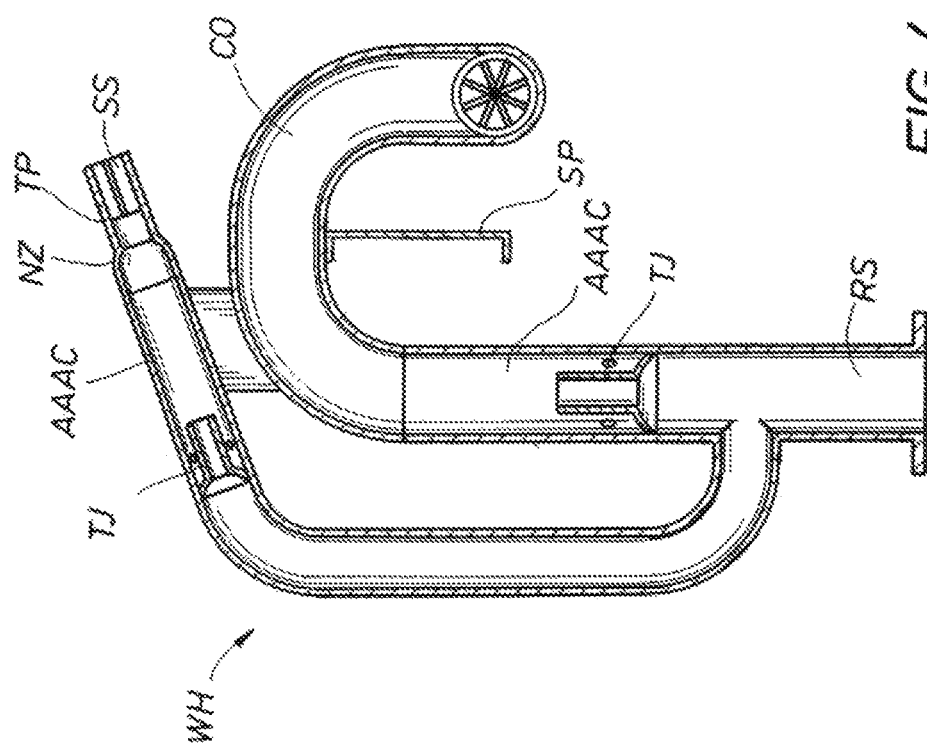
FIG. 4 illustrates in a cross section the wand head of FIG. 3.

FIGS. 3 and 4 illustrate in full as well as in cut-away a further embodiment incorporating three of the instant aerating foam projecting nozzles into a wand head WH. Each nozzle NZ has a tip TP and a stream shaper SS. Upstream of the nozzles are first and second ambient air aeration chambers AAAC. A support plate SP helps to assist affixing the nozzles NZ to the top of a tank wall TW in desired locations, as shown in FIG. 4. A partial section of a riser RS below the wand head is shown in FIG. 4, including brackets BR in FIG. 3 useful for affixing or stabilizing the riser RS with respect to the tank wall TW. Wind girder WG is also illustrated in FIG. 3.

FIG. 5 illustrates a cut away of a different version of a nozzle NZ having tip portion TP with stream shaper SS. Conduit CD is shown connecting nozzle NZ with ambient air aeration chamber AAAC having tubular jet TJ. A portion of riser RS is also illustrated in FIG. 5.

FIG. 6 illustrates the embodiment of FIG. 5 with riser RS attached to tank wall TW using brackets BR. Nozzle NZ is inserted through an opening TWO in the tank wall TW. The tank is shown with a tank fixed roof TFR.

FIGS. 7A-7F provide drawings for an embodiment of a foam wand in general overview. The wand head WH is shown resting on a wand support plate SP. Foam wand riser RS is shown affixed to a wand head portion. Foam wand mounting clamps or brackets BR are illustrated for mounting riser RS to the side of a tank wall TW. The assembly of the foam wand riser pipe and wand head together with foam wand support plate is illustrated in FIG. 7F.

FIG. 8 illustrates a foam wand head WH in greater detail including in particular an embodiment of a stream shaper SS comprised of fins FN that fits in a tip portion TP of the nozzles on the foam wand head WH. FIG. 8B illustrates a crosswire screen CW placed in the ambient air aeration chamber just downstream of the tubular jet TJ, with one eighth inch cross wires to break the jet stream at that portion of flow.

The foregoing figures illustrate various embodiments of an aerated foam projecting nozzle to project fire fighting foam in a substantially focused stream, and in particular a nozzle structured for projecting at least 100 gpm of aerated foam at 100 psi. As can be seen the nozzle has a tip portion defining a longitudinal axis and preferably terminating in a solid bore discharge orifice. However, an annular discharge orifice should also work. The tip portion of the nozzle incorporates a stream shaper and, as frequently included, a swedge-down portion. The stream shaper has at least four fins with a longitudinal dimension in the tip portion greater than the radial dimension in the tip portion. It can be seen that the fins terminate substantially flush with the nozzle tip discharge orifice in the preferred embodiments. FIG. 8E illustrates that preferably greater than four fins are employed and preferably the fins have a longitudinal dimension LD greater than twice the radial dimension RD (See FIGS. 8E, 8H, 8I.). Also preferably, the nozzle is structured to flow between 100 gpm and 900 gpm at 100 psi.

As further illustrated by the foregoing figures, a nozzle for projecting aerated fire fighting foam in a substantially focused stream is proximately attached downstream of, and in fluid communication with, an ambient air aeration chamber, AAAC. The ambient air aeration chamber preferably includes a tubular jet structure TJ, preferably also with crosshairs CW or a cross haired screen just downstream of the tubular jet structure TJ to further break up the flow. (See FIG. 8B.)

Preferably the nozzle and ambient air aeration chamber are structured in combination to project foam with an expansion of between 2 to 1 to 8 to 1. More preferably, the nozzle and aeration chamber are structured in combination to project foam with an expansion of between 3 to 1 to 5 to 1.

The nozzles for projecting fire fighting foam in a substantially focused stream are particularly adapted for being attached proximate a top portion of an at least 100 foot diameter industrial tank wall, as illustrated in FIGS. 3 and 7F. A riser RS preferably places the nozzle for projecting aerated fire fighting foam in a substantially focused stream proximate a top portion of an industrial tank wall and provides the nozzle and aeration chamber with a source of fire fighting water and foam concentrate.

In operation a substantially focused stream of aerated fire fighting foam is projected by supplying water and foam concentrate to an ambient air aeration chamber proximately attached upstream of, and in fluid communication with, an aerated foam projecting fire fighting nozzle, and by projecting aerated foam with an expansion of between 2 to 1 to 8 to 1 from the nozzle in a in a substantially focused stream, the nozzle having a tip of at least four fins, the fins having longitudinal dimension greater than a radial dimension and terminating substantially flush with a nozzle tip solid bore discharge orifice DO. (See FIG. 8A.)

In operation also, a substantially focused stream of aerated fire fighting foam can be projected by supplying water and foam concentrate to an ambient air aeration chamber proximately attached upstream of and in fluid communication with an aerated foam projecting foam fire fighting nozzle. The method includes projecting aerating foam with an expansion of between 2 to 1 to 8 to 1 from the nozzle in a substantially focused stream with the nozzle having a tip of greater than four fins and the fins having a longitudinal dimension greater than twice the radial dimension, the fins terminating substantially flush with a nozzle tip discharge orifice.

Preferably the methodology includes projecting foam with an expansion of between 3 to 1 to 5 to 1 into an at least 100 foot diameter industrial tank from a position proximate a top portion of a tank wall.

Again, FIGS. 1A, 2, 7A and 8A illustrate a wand head WH for a wand W, the wand head having at least one aerated foam projecting nozzle NZ for projecting foam in a substantially focused stream in a roughly horizontal direction around an inside tank wall surface. See in particular FIG. 2 and FIGS. 7A-7F. See also FIGS. 13 and 14 for an embodiment of a wand W including a riser RS and wand head WH.

Figure 8A:
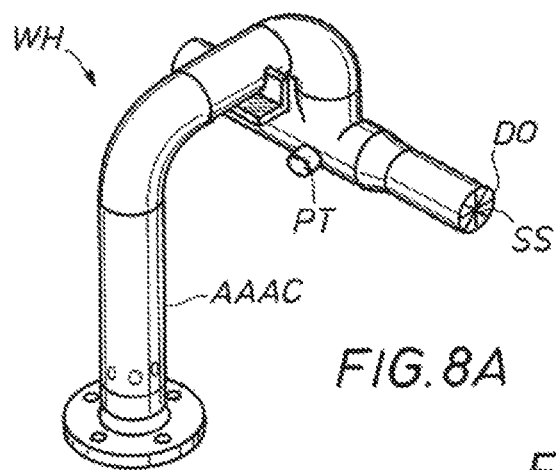
Figure 8B:
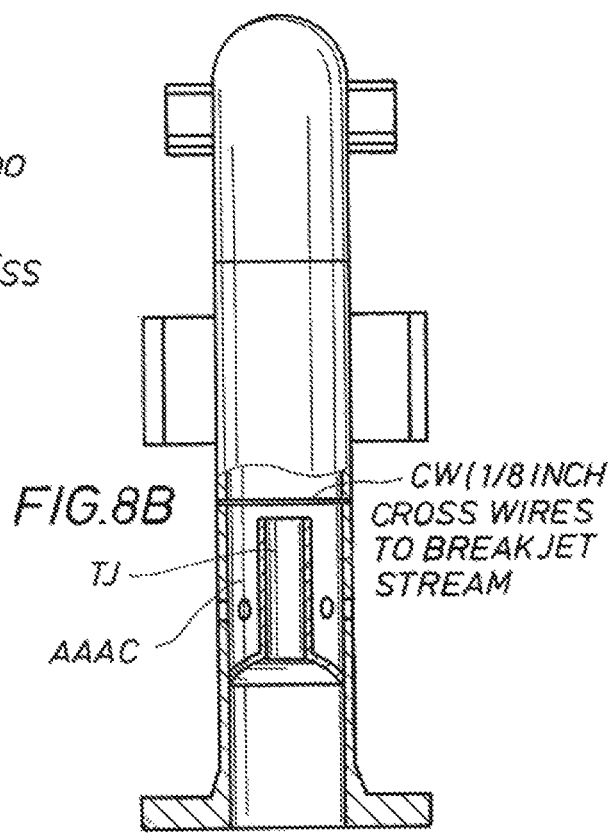
Figure 8C:
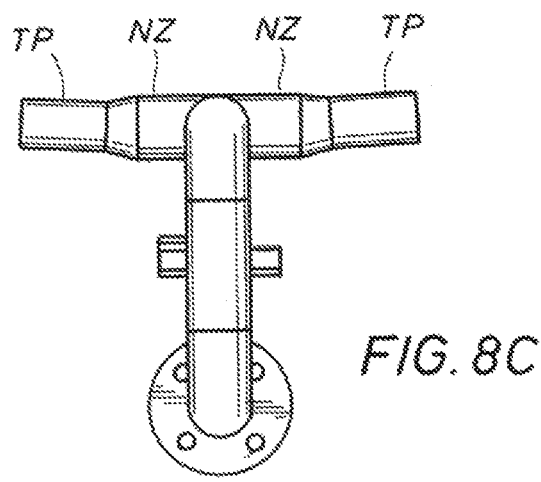

FIGS. 1A, 2 and in particular FIG. 8B illustrate an ambient air aeration chamber AAAC located upstream of, proximate to, and in fluid communication with, at least one aerated foam projecting nozzle NZ.

FIGS. 1A, 2 and in particular 8A, 8D, 8E, 8H and 8I illustrate a nozzle NZ having at least four fins FN in a tip portion TP of the nozzle NZ. The fins FN have a longitudinal dimension LD greater than a radial dimension RD and terminate substantially flush with a nozzle tip TP discharge orifice DO.

FIGS. 1A, 2, 8A, 8E, 8H and 8I, as well as FIG. 13, illustrate an embodiment of an aeration chamber structured together with a nozzle to project at least 100 gpm at 100 psi of aerated foam having an expansion of between 2-to-1 to 8-to-1.

FIGS. 2 and 13 illustrate the nozzle NZ and chamber AAAC attached to a riser RS for communicating water and foam concentrate.

FIGS. 7A-7F, and in particular and FIGS. 13 and 14, illustrate at least one nozzle and riser structured in combination for attachment to a tank wall of at least 100 foot diameter tank such that the nozzle projects foam in a roughly horizontal direction around an interior top tank wall surface.

FIGS. 1A, 2, 7A, 8A and 13 and 14 show two aerated foam projecting nozzles NZ, the two nozzles structured in combination to project roughly horizontally in roughly opposing directions. Roughly opposing directions should be taken to mean directly opposite plus or minus 15°. Alternately stated, each nozzle should project within 15 degrees of 1 common average longitudinal axis for the pair of nozzles. A roughly horizontal direction should be taken to mean within 15° of the horizontal.

Figure 8D:
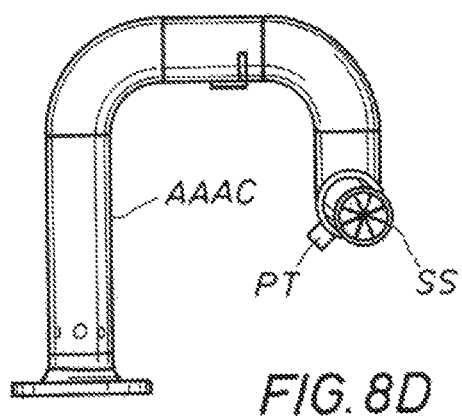
Figure 8F:
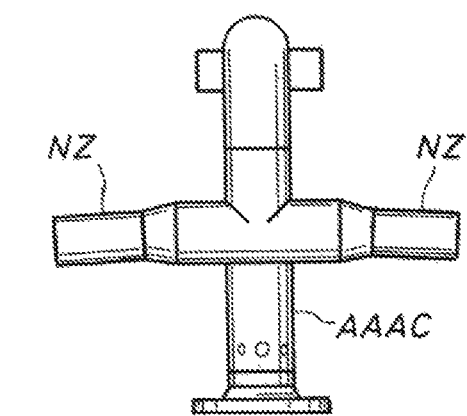
Figure 11A:
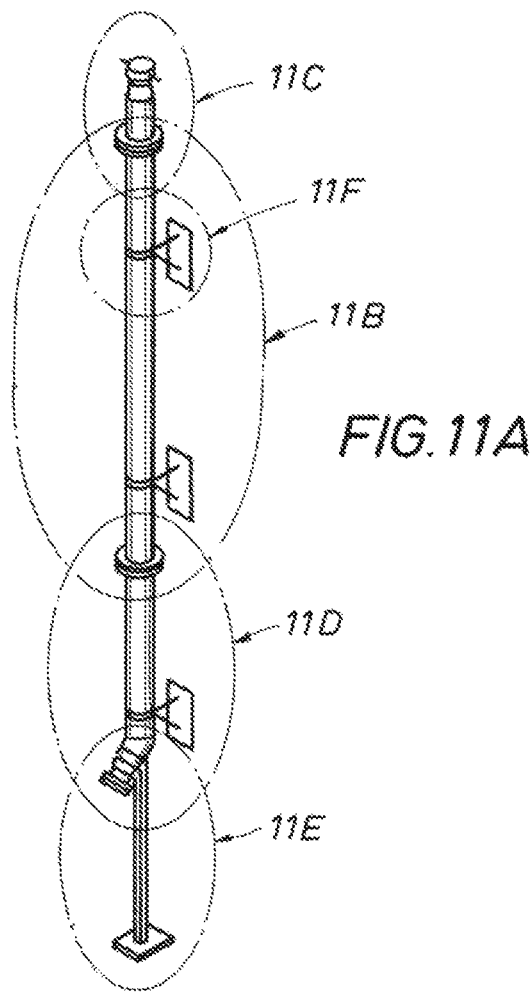
FIGS. 11A-G provide drawing sheet depictions for the monitor riser embodiment of FIGS. 9 and 10.
Figure 11B:
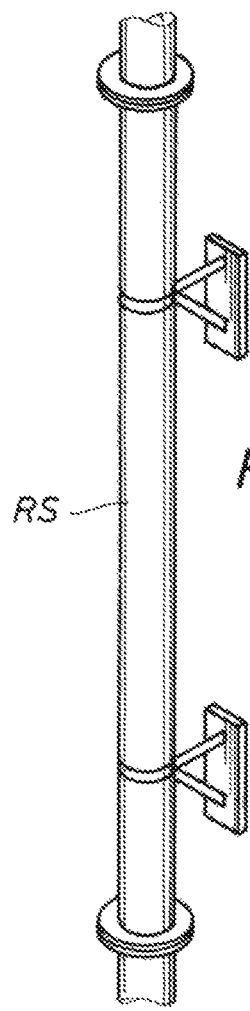
Figure 11C:
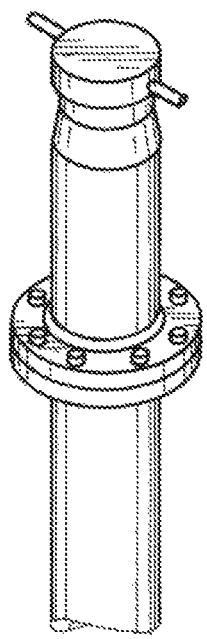
Figure 11E:
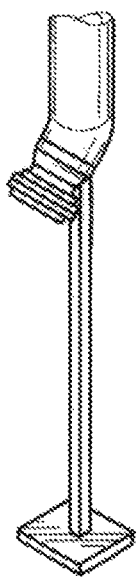
Figure 11D:
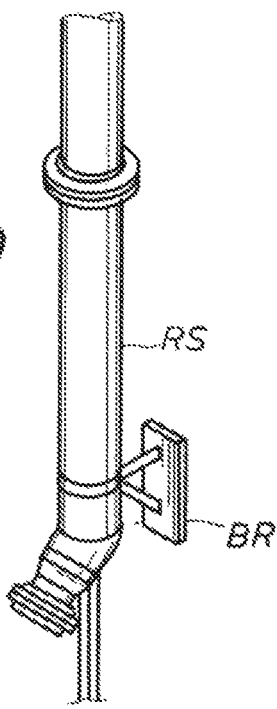
Figure 11G:
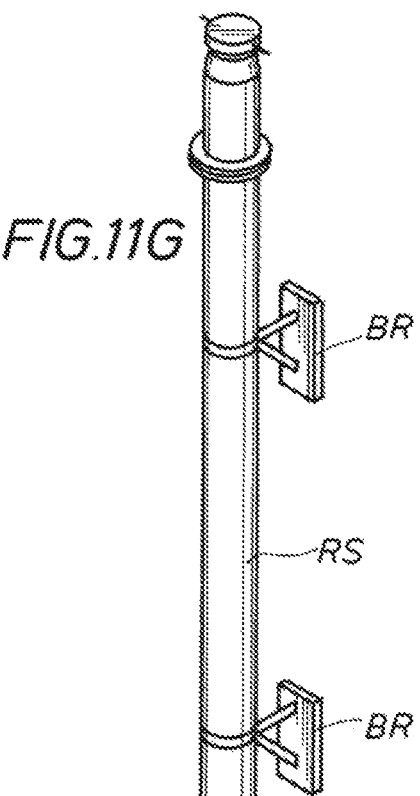
Figure 11F:
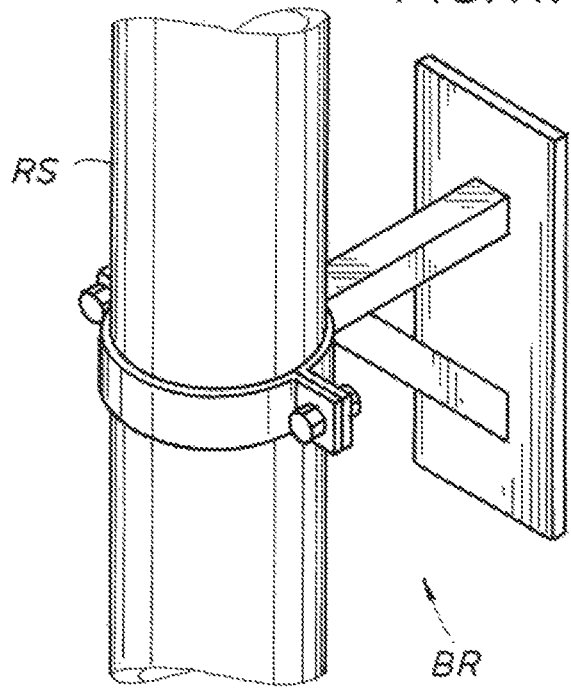

FIGS. 1A, 2, 7A-7F, 8A-8M, 13 and 14 also illustrate aeration chambers and a nozzle or nozzles that can be structured to project aerated foam with an expansion of between 3-to-1 to 5-to-1. FIG. 8D illustrates a discharge port PT structured in a fluid conduit between the nozzles and an aeration chamber, the discharge port structured to discharge up to 150 gpm of aerated foam predominantly in a direction roughly perpendicular to the said opposing direction.

FIGS. 1A, 2, 7A-7F, 8A-8M, 13 and 14 illustrate a nozzle or nozzles that can be structured to project aerated foam at between 100 gpm and 900 gpm at 100 psi.

FIG. 15 illustrates a plurality of four wands spaced around a tank periphery, approximately 190 feet apart.

FIG. 7F illustrates an at least 2 inch riser RS structured to extend from proximate a ground location to proximate an at least 45 foot high industrial top tank wall portion. One of skill in the art knows that industrial storage tanks of 60 foot diameter and greater have a wall height of approximately 45 feet or greater.

Figure 12:
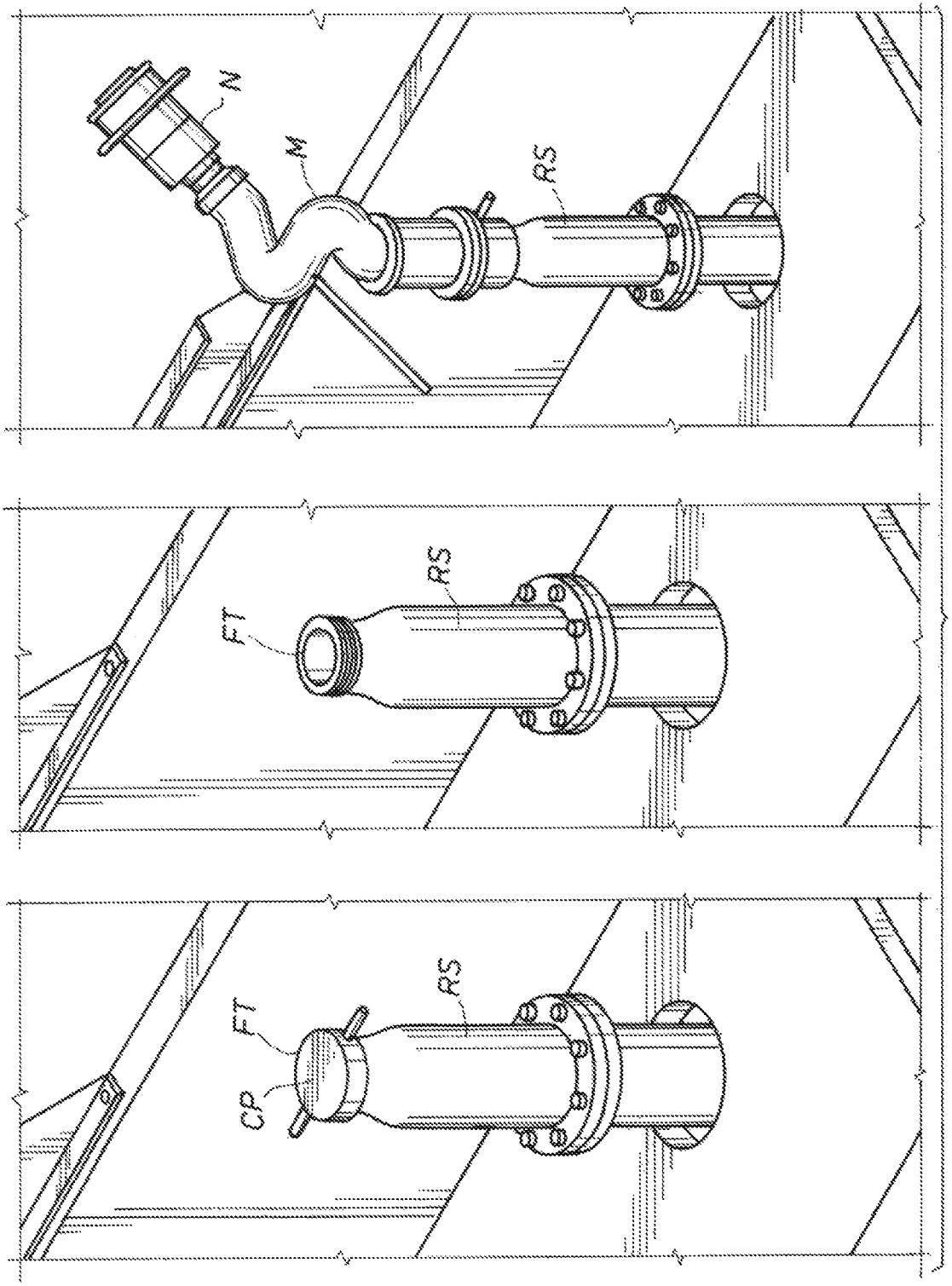
FIG. 12 illustrates an embodiment of a free standing riser for attaching a portable monitor and nozzle and with a portable monitor and nozzle attached.

FIGS. 9-12 illustrate an at least four inch riser RS, preferably comprised of riser top portion RTP, riser extension pipe REP, and riser inlet pipe RIP. See FIG. 9. FIG. 10 illustrates a riser foot rest kit for stabilizing an at least four inch riser RS. FIG. 11G further illustrates an at least four inch riser RS. FIG. 12 illustrates riser RS located proximate a tank wall. FIGS. 12 and 13 illustrate riser RS located proximate a tank wall and structured to extend from proximate the ground to proximate a tank wall portion. A fire fighting nozzle capable of at least 150 gpm is shown attached to the monitor riser in FIGS. 12 and 13. The monitor riser is indicated attached to monitor M and nozzle N. It can be seen from FIGS. 12 and 13 that the monitor and nozzle is structured to discharge from proximate the top tank wall, and including an ability to discharge roughly toward the center of the tank. Roughly toward the center of the tank should be interpreted as toward the center of the tank +/−30°.

Again, FIG. 9 illustrates a riser for a portable monitor and nozzle, the riser RS comprised of three sections, RTP, REP and RIP, and structured to communicate fire fighting fluid from proximate a ground location to proximate the top of an at least 45 foot high industrial storage tank, as illustrated by FIG. 13A. A fitting FT is illustrated attached to the distal end of the riser RS, structured to releasably affix an at least 150 gpm portable monitor M and nozzle N. In this case the fitting is comprised of exterior male threads upon the upper portion of the riser pipe. A removable cap as well as the portable monitor and nozzle will have mating interior female threads, probably assisted by a pair of turning ears, to effect quick attachment and release.

Figure 16:
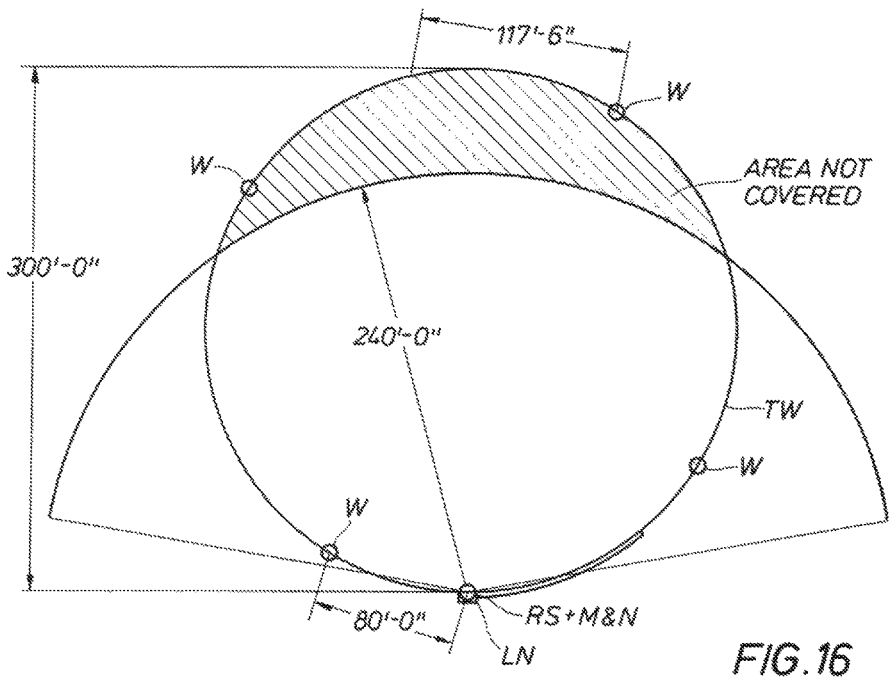
FIG. 16 illustrates a designed deployment of the point and shoot system for a 300 foot storage tank for rim seal and vapor protection. Foam wand locations are indicated and one riser is indicated at the landing for placement of a portable monitor and nozzle.
Figure 17:
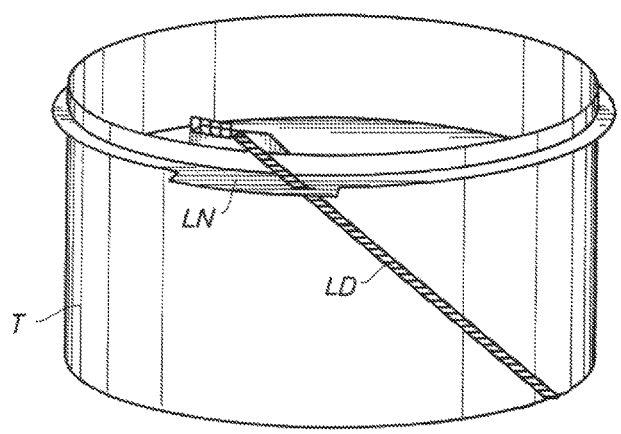

FIG. 16 illustrates staging the riser RS with monitor and nozzle at a landing LN of a tank. As is known in the art a ladder is affixed to a tank, leading to the landing. FIG. 17 illustrates a typical tank with a ladder LD and landing LN.

In operation an aerated foam projecting nozzle would preferably project aerated foam roughly horizontally in a substantially focused stream around an inside top tank wall surface of an at least 100 foot diameter tank. The nozzle would produce aerated foam having an expansion of between 2-to-1 to 8-to-1. Preferably the foam would have an expansion of between have an expansion of between 3-to-1 to 5-to-1. Preferably two aerated foam projecting foam nozzles would be included, projecting roughly horizontally in substantially focused streams and in roughly opposing directions. Preferably the nozzle or nozzles would be affixed to an upper wall portion of an industrial storage tank.

In a point and shoot method, fire fighting fluid from approximately the ground is also provided to approximately the tank top through an at least four inch riser located proximate the tank wall, the at least four inch riser attachable to an at least 150 gpm portable monitor and nozzle by virtue of a fitting on a distal end of the at least four inch riser. Alternately an at least 150 gpm nozzle could be fixedly attached to the at least four inch riser. The fixed nozzle would be structured with the riser to discharge proximate to a tank top wall portion and toward the center of the tank. The portable monitor and nozzle can be aimed and turned by a fire fighter.

In the point and shoot method if the at least four inch riser is structured to releasably attach to a portable monitor and nozzle, then the at least four inch riser should be located proximate a landing at the top of the tank wall. Alternately, if the at least four inch riser is structured to fixedly attach to a fire fighting nozzle, then the riser can be located any place around the periphery around the tank including a plurality of places. The riser and the fixed nozzle would be structured such that the nozzle discharges roughly toward the center of the tank.

FIG. 17 illustrates a typical ladder LD and landing LN of an industrial storage tank T. FIGS. 18 and 19 provide a table estimating the number of foam wands required for a point and shoot system as a function of the height of the foam dam of a floating roof. These are the number of foam wands needed for full encirclement seal protection.

The foregoing description of preferred embodiments of the invention is presented for purposes of illustration and description, and is not intended to be exhaustive or to limit the invention to the precise form or embodiment disclosed. The description was selected to best explain the principles of the invention and their practical application to enable others skilled in the art to best utilize the invention in various embodiments. Various modifications as are best suited to the particular use are contemplated. It is intended that the scope of the invention is not to be limited by the specification, but to be defined by the claims set forth below. Since the foregoing disclosure and description of the invention are illustrative and explanatory thereof, various changes in the size, shape, and materials, as well as in the details of the illustrated device may be made without departing from the spirit of the invention. The invention is claimed using terminology that depends upon a historic presumption that recitation of a single element covers one or more, and recitation of two elements covers two or more, and the like. Also, the drawings and illustration herein have not necessarily been produced to scale.

What is claimed is:

1. A wand having at least one aerated foam projecting nozzle for projecting aerated fire-fighting foam, the wand comprising:
   an ambient air aeration chamber located upstream of, proximate to, and in fluid communication with, the at least one aerated foam projecting nozzle, the at least one aerated foam projecting nozzle having a plurality of fins in a cylindrical tip portion, an end of the cylindrical tip portion terminating the at least one aerated foam projecting nozzle at a discharge orifice at an outermost end, each of the plurality of fins having a longitudinal dimension greater than a radial dimension and terminating flush with the outermost end, wherein the longitudinal dimension of each of the plurality of fins is measured longitudinally along a longitudinal axis of the cylindrical tip portion and the radial dimension of each of the plurality of fins is measured radially from the longitudinal axis of the cylindrical tip portion out toward a wall of the cylindrical tip portion;
   the ambient air aeration chamber structured together with the at least one aerated foam projecting nozzle to project at least 100 gallons per minute (gpm) of aerated foam having an expansion ratio of at least 2-to-1;
   the at least one aerated foam projecting nozzle and the ambient air aeration chamber attached to a riser for communicating water and foam concentrate; and
   the at least one aerated foam projecting nozzle and the riser structured in combination for attachment to a tank wall of a tank such that the at least one aerated foam projecting nozzle projects foam in a horizontal direction around an interior top tank wall surface of the tank.

2. The wand of claim 1, wherein the at least one aerated foam projecting nozzle includes two aerated foam projecting nozzles, the two aerated foam projecting nozzles structured in combination to project in roughly opposing directions around the interior top tank wall surface of the tank.

3. The wand of claim 2, wherein the ambient air aeration chamber and the two aerated foam projecting nozzles are structured together to project the aerated foam with an expansion ratio of between 3-to-1 and 5-to-1.

4. The wand of claim 2 including a discharge port structured in a fluid conduit between the two aerated foam projecting nozzles and the ambient air aeration chamber, the discharge port structured to discharge up to 150 gpm of aerated foam in a direction perpendicular to the opposing directions.

5. The wand of claim 2 wherein the two aerated foam projecting nozzles are structured to project aerated foam at between 100 gpm and 900 gpm.

6. The wand of claim 2 wherein the riser includes an at least 2 inch riser structured to extend from a ground location to an at least 45 foot high industrial tank top wall portion.

7. A plurality of wands in accordance with claim 6, attached around a tank wall at least 150 feet apart.

8. A plurality of wands in accordance with claim 6 attached around a tank wall at least 200 feet apart.

9. A plurality of wands in accordance with claim 6 attached around a tank wall at least 240 feet apart.

10. The wand of claim 6 including an at least four inch riser located proximate a tank wall, structured to extend from proximate the ground to proximate a top tank wall portion, the at least four inch riser having a fitting at a top end suitable to attach a portable monitor and the two aerated foam projecting nozzles.

11. The wand of claim 10 including the fitting at the top end is structured to mount a portable 150 gpm to 1000 gpm rated monitor and the two aerated foam projecting nozzles.

12. The wand of claim 2, further comprising a third aerated foam projecting nozzle, the third aerated foam projecting nozzle configured to project the aerated foam approximately toward a center of the tank.

13. The wand of claim 12, wherein the third aerated foam projecting nozzle is configured to project the aerated foam toward the center of the tank within ±30° of a median directly center directional axis.

14. The wand of claim 12, wherein the ambient air aeration chamber comprises a first ambient air aeration chamber in fluid communication with the two aerated foam projection nozzles such that each of the two aerated foam projecting nozzles are configured to project the aerated foam in the roughly opposing directions; and further comprising a second ambient air aeration chamber in fluid communication with the third aerated foam projecting nozzle.

15. The wand of claim 14, wherein the first ambient air aeration chamber and the second ambient air aeration chamber are in fluid communication with a common riser.

16. The wand of claim 14, wherein the first ambient air aeration chamber is in fluid communication with a first riser; and wherein the second ambient air aeration chamber is in fluid communication with a second riser.

17. The wand of claim 14, further comprising an opening configured to discharge the aerated foam directly beneath the wand.

18. The wand of claim 17, wherein the opening comprises a fourth nozzle.

19. The wand of claim 17, wherein the opening comprises a port.

* * * * *